(12) United States Patent
Byun et al.

(10) Patent No.: US 11,662,552 B2
(45) Date of Patent: May 30, 2023

(54) OPTICAL IMAGING SYSTEM

(71) Applicant: SAMSUNG ELECTRO-MECHANICS CO., LTD., Suwon-si (KR)

(72) Inventors: Joon Hee Byun, Suwon-si (KR); Ho Sik Yoo, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 301 days.

(21) Appl. No.: 17/005,500

(22) Filed: Aug. 28, 2020

(65) Prior Publication Data
US 2021/0063703 A1    Mar. 4, 2021

(30) Foreign Application Priority Data
Aug. 30, 2019  (KR) .................. 10-2019-0107775

(51) Int. Cl.
*G02B 9/60* (2006.01)
*G02B 13/00* (2006.01)
*H04N 5/225* (2006.01)
*G02B 27/00* (2006.01)
*G02B 13/02* (2006.01)

(52) U.S. Cl.
CPC ........... *G02B 9/60* (2013.01); *G02B 13/0045* (2013.01); *G02B 13/02* (2013.01); *G02B 27/0025* (2013.01); *H04N 5/2254* (2013.01)

(58) Field of Classification Search
None
See application file for complete search history.

(56) References Cited

U.S. PATENT DOCUMENTS

| 8,179,614 B1 * | 5/2012 | Tsai ................... G02B 13/0045 359/764 |
| 8,964,309 B2 * | 2/2015 | Uchida ............. G02B 13/0045 359/764 |
| 10,436,954 B2 * | 10/2019 | Shih ................... G02B 13/0055 |
| 11,106,010 B2 | 8/2021 | Lee et al. |

(Continued)

FOREIGN PATENT DOCUMENTS

| CN | 108254857 A | 7/2018 |
| KR | 10-2006-0102466 A | 9/2006 |

(Continued)

OTHER PUBLICATIONS

Office Action dated Jan. 28, 2021 issued in counterpart Taiwanese Patent Application No. 109129715 (7 pages in English)(7 pages in Taiwanese).

(Continued)

*Primary Examiner* — Darryl J Collins
(74) *Attorney, Agent, or Firm* — NSIP Law

(57) ABSTRACT

An optical imaging system includes a first lens having positive refractive power, a second lens, a third lens, a fourth lens, and a fifth lens, arranged in order from an object side. The first lens is shaped such that a length of a first axis, which intersects an optical axis, is greater than a length of a second axis, which intersects the optical axis and is perpendicular to the first axis. The optical imaging system satisfies $4.5 < TTL/IMG\ HT < 6.5$; $0.87 < TTL/f < 1.31$; and $0.65 < L1S1es/L1S1el < 0.9$.

24 Claims, 18 Drawing Sheets

(56) References Cited

U.S. PATENT DOCUMENTS

| | | | |
|---|---|---|---|
| 2002/0114085 A1* | 8/2002 | Hattori | G11B 7/13922 |
| | | | 359/811 |
| 2012/0162784 A1 | 6/2012 | Tang et al. | |
| 2016/0139359 A1* | 5/2016 | Lin | G02B 5/005 |
| | | | 359/793 |
| 2016/0187622 A1 | 6/2016 | Huang | |
| 2016/0238821 A1 | 8/2016 | Liao et al. | |
| 2017/0097493 A1 | 4/2017 | Dai et al. | |
| 2018/0143403 A1 | 5/2018 | Tseng et al. | |
| 2018/0188501 A1 | 7/2018 | Lee et al. | |
| 2020/0150406 A1 | 5/2020 | Chen et al. | |

FOREIGN PATENT DOCUMENTS

| | | |
|---|---|---|
| KR | 10-1963591 B1 | 4/2019 |
| TW | 201227043 A1 | 7/2012 |
| TW | 201624045 A | 7/2016 |
| TW | I659239 B | 5/2019 |
| WO | WO 2015/143778 A1 | 10/2015 |

OTHER PUBLICATIONS

Taiwanese Office Action dated Mar. 18, 2022, in counterpart Taiwanese Patent Application No. 110137217 (7 pages in English and 5 pages in Mandarin).
Korean Office Action dated Aug. 8, 2022, in counterpart Korean Patent Application No. 10-2020-0109418 (7 Pages in Korean, 10 Pages in English).

* cited by examiner

OPTICAL IMAGING SYSTEM

CROSS-REFERENCE TO RELATED APPLICATION(S)

This application claims the benefit under 35 USC 119(a) of Korean Patent Application No. 10-2019-0107775 filed on Aug. 30, 2019 in the Korean Intellectual Property Office, the entire disclosure of which is incorporated herein by reference for all purposes.

BACKGROUND

1. Field

The following description relates to an optical imaging system.

2. Description of Related Art

A camera has been used in portable electronic devices such as smartphones. Miniaturization of a camera mounted on the portable electronic devices has been demanded due to demand for miniaturization of such portable electronic devices.

Furthermore, a telephoto camera has been adopted in portable electronic devices to obtain a zoom effect for capturing a subject with a relatively narrow angle of view.

However, when a plurality of lenses is arranged in the portable electronic device in the thickness direction, a thickness of the portable electronic device may increase as the number of lenses increases. Accordingly, there is a problem that this is not fit the trend of miniaturization of portable electronic devices.

Particularly, since a telephoto camera has a relatively long focal length, there is a problem that it is difficult to apply to a relatively thin portable electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An optical imaging system that may be mounted on a portable electronic device having a relatively small thickness, and has a relatively long focal length.

In one general aspect, an optical imaging system includes a first lens having positive refractive power, a second lens, a third lens, a fourth lens, and a fifth lens, arranged in order from an object side. The first lens is shaped such that a length of a first axis, which intersects an optical axis, is greater than a length of a second axis, which intersects the optical axis and is perpendicular to the first axis. The optical imaging system satisfies $4.5<TTL/IMG\ HT<6.5$; $0.87<TTL/f<1.31$; and $0.65<L1S1es/L1S1el<0.9$, where TTL is a distance on the optical axis from an object-side surface of the first lens to an imaging surface of an image sensor, IMG HT is half a diagonal length of the imaging surface of the image sensor, f is a total focal length of the optical imaging system, L1S1el is a maximum effective radius of the object-side surface of the first lens, and L1S1es is a minimum effective radius of the object-side surface of the first lens.

The optical imaging may include a first reflective member disposed on an object side of the first lens, and the first reflective member may include a reflective surface configured to change a path of light incident on the first reflective member to be directed toward the first lens.

The optical imaging system may satisfy $0<L1S1el/PTTL<0.2$, where PTTL is a distance on the optical axis from the reflective surface to the imaging surface of the image sensor.

The first lens may include an optical portion and a flange portion extending around at least a portion of the optical portion, and the optical imaging system may satisfy $0<AL1/(PTTL)2<0.09$, where AL1 is an area of the optical portion of the object-side surface of the first lens, and PTTL is a distance along the optical axis from the reflective surface of the first reflective member to the imaging surface of the image sensor.

The optical imaging system may include a second reflective member disposed between the fifth lens and the image sensor, and the second reflective member may include a reflective surface configured to change a path of light passing through the first lens to the fifth lens to be directed toward the image sensor.

The first lens may include an optical portion and a flange portion extending around at least a portion of the optical portion. The optical portion may include a first edge, a second edge disposed on an opposite side of the first edge with respect to the optical axis, and a third edge and a fourth edge respectively connecting the first edge and the second edge. The third edge may be disposed on a side opposite to the fourth edge with respect to the optical axis, and a shortest distance between the first edge and the second edge may be greater than a shortest distance between the third edge and the fourth edge.

The optical imaging system may satisfy $50°<\alpha<92°$, where α is an angle between a first virtual line connecting the optical axis from a connection point of the first edge and the fourth edge, and a second virtual line connecting the optical axis from a connection point of the second edge and the fourth edge.

The optical imaging system may satisfy $1.3<\alpha/(2*FOV)<2.2$, where FOV is an angle of view of the optical imaging system, and α is an angle between a first virtual line connecting the optical axis from a connection point of the first edge and the fourth edge, and a second virtual line connecting the optical axis from a connection point of the second edge and the fourth edge.

The optical imaging system may satisfy $0.9<BFL/(2*IMG\ HT)<3.0$, where BFL is a distance along the optical axis from an image-side surface of the fifth lens to the imaging surface of the image sensor.

The optical imaging system may satisfy $-0.7\ mm<f1+f2<1.3\ mm$, where f1 is a focal length of the first lens, and f2 is a focal length of the second lens.

The second lens may be shaped such that a length of a first axis of the second lens, which intersects the optical axis, is greater than a length of a second axis of the second lens, which intersects the optical axis and is perpendicular to the first axis of the second lens, and the optical imaging system may satisfy $0.7<L2S1es/L2S1el<0.9$, where L2S1el is a maximum effective radius of an object-side surface of the second lens, and L2S1es is a minimum effective radius of the object-side surface of the second lens.

The fifth lens may be shaped such that a length of a first axis of the fifth lens, which intersects the optical axis, is greater than a length of a second axis of the fifth lens, which intersects the optical axis and is perpendicular to the first axis of the fifth lens, and the optical imaging system may satisfy 1.3<L1S1el/L5S2el<1.7, where L5S2el is a maximum effective radius of an image-side surface of the fifth lens.

The optical imaging system may satisfy 1.3<(CT5/ET5)*L5S1el<2.5, where CT5 is a thickness along the optical axis of the fifth lens, ET5 is a thickness of an edge of the fifth lens, and L5S1el is a maximum effective radius of an object-side surface of the fifth lens.

The third lens may be shaped such that a length of a first axis of the third lens, which intersects the optical axis, is greater than a length of a second axis of the third lens, which intersects the optical axis and is perpendicular to the first axis of the third lens, and the optical imaging system may satisfy 1.3<L1S1el/L3S1el<1.7, where L3S1el is a maximum effective radius of an object-side surface of the third lens.

The fifth lens may be shaped such that a length of a first axis of the fifth lens, which intersects the optical axis, is greater than a length of a second axis of the fifth lens, which intersects the optical axis and is perpendicular to the first axis of the fifth lens, and the optical imaging system may satisfy 0.8<L3S1el/L5S1el<1.2, where L5S1el is a maximum effective radius of an object-side surface of the fifth lens.

The second lens may have negative refractive power, the third lens may have positive refractive power, the fourth lens may have positive or negative refractive power, and the fifth lens may have positive or negative refractive power.

The second lens and the third lens may have negative refractive power, respectively.

The first lens may include a convex object-side surface.
The first lens may include a convex image-side surface.
The second lens may include a concave image-side surface.
The third lens may include a convex object-side surface.
The fourth lens may include at least one concave surface.
The fifth lens may include a concave image-side surface.

A portable electronic device may include three or more camera modules, wherein an optical axis of a first camera module is formed in a different direction from an optical axis of a second camera module and an optical axis of a third camera module, and the image sensor may be configured to convert light incident through the first to fifth lenses to an electrical signal The first camera module may have the narrowest angle of view and the longest focal length, the third camera module may have the widest angle of view and the shortest focal length, and the second camera module may have a wider angle of view than the first camera module and a narrower angle of view than the third camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
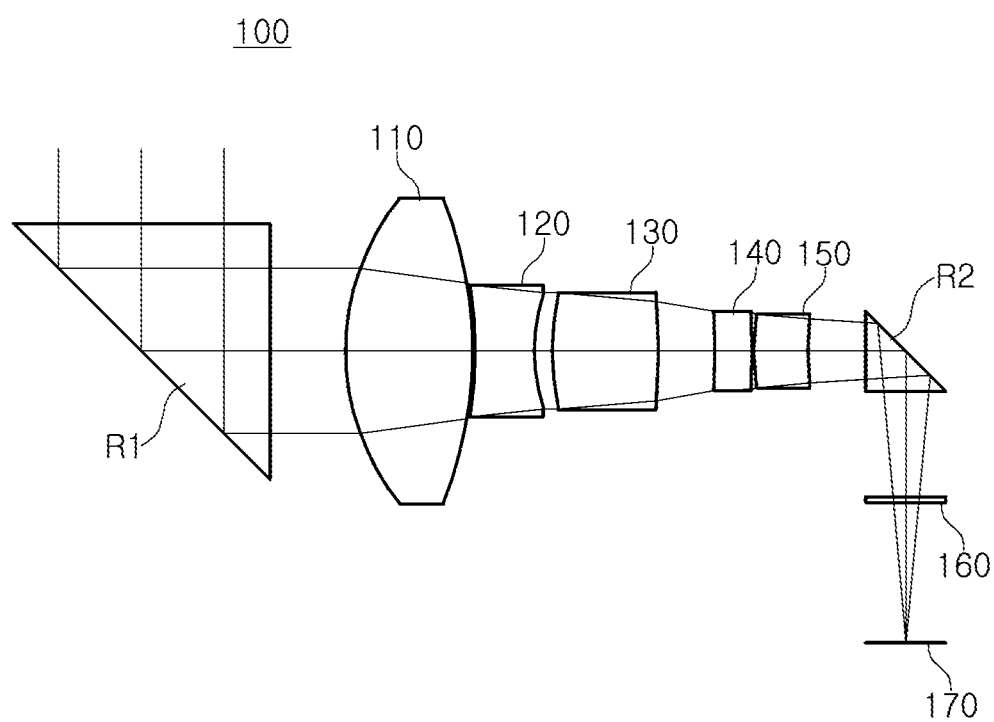
FIG. 1 is a configuration diagram of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail with reference to the drawings.

For example, those skilled in the art who understand the spirit of the present disclosure may easily propose other examples included within the scope of the spirit of the present disclosure by way of addition, change, or deletion of components, etc, and the proposal will be said to be may be included within the scope of the present disclosure.

In addition, throughout the specification, the term 'comprising' or 'including' indicates that other elements may be included, rather than excluding other elements, unless specifically stated otherwise.

In the following lens configuration diagrams, the thickness, size, and shape of lenses may be illustrated in a somewhat exaggerated manner for explanatory purposes, and in detail, the shape of a spherical or aspheric surface presented in the lens configuration diagram is illustrated by way of example only and is not limited thereto.

An optical imaging system according to an example may include a plurality of lenses disposed along an optical axis. The plurality of lenses may be spaced from each other by a predetermined distance along the optical axis.

As an example, the optical imaging system may include five lenses.

A first lens refers to a lens closest to an object side (or a reflective member), and a fifth lens refers to a lens closest to an image sensor.

In addition, in each lens, a first surface refers to a surface (or an object-side surface) adjacent to the object, and a second surface refers to a surface (or an image-side surface) adjacent to an imaging plane. Herein, the numerical values with respect to a radius of curvature of a lens, a thickness, and the like of the lens are all in mm, and the unit of an angle is degrees.

In addition, in the description of the shape of each lens, a convex shape of one surface indicates that a paraxial region of the surface is convex, and a concave shape of one surface indicates that a paraxial region of the surface is concave. Therefore, even in the case in which one surface of the lens is described as having a convex shape, an edge portion of the lens may be concave. Similarly, even in a case in which one surface of the lens is described as having a concave shape, the edge portion of the lens may be convex.

The paraxial region refers to a relatively narrow region near an optical axis.

An optical imaging system according to the various examples may include five lenses.

For example, an optical imaging system according to an example may include a first lens, a second lens, a third lens, a fourth lens, and a fifth lens, arranged in order from the object side.

However, the optical imaging system may be not only composed of five lenses, and may further include other components.

For example, the optical imaging system may further include a reflective member having a reflective surface changing an optical path. For example, the reflective member may be a mirror or a prism.

The reflective member may be disposed closer to the object side than the plurality of lenses. For example, the reflective member may be disposed closer to the object side than the first lens. Therefore, a lens disposed closest to the object side may be a lens disposed closest to the reflective member.

In addition, the optical imaging system may further include an image sensor for converting an image of an incident subject into an electrical signal.

In addition, the optical imaging system may further include an infrared cutoff filter (hereinafter, referred to as a filter) for blocking infrared rays. The filter is disposed between the image sensor and a lens (a fifth lens) disposed closest to the image sensor.

Also, two reflective members may be provided. In this case, one reflective member may be disposed closer to the object side than the first lens, and the other reflective member may be disposed between the fifth lens and the filter.

All lenses constituting the optical imaging system may be formed of a plastic material.

Figure 15:
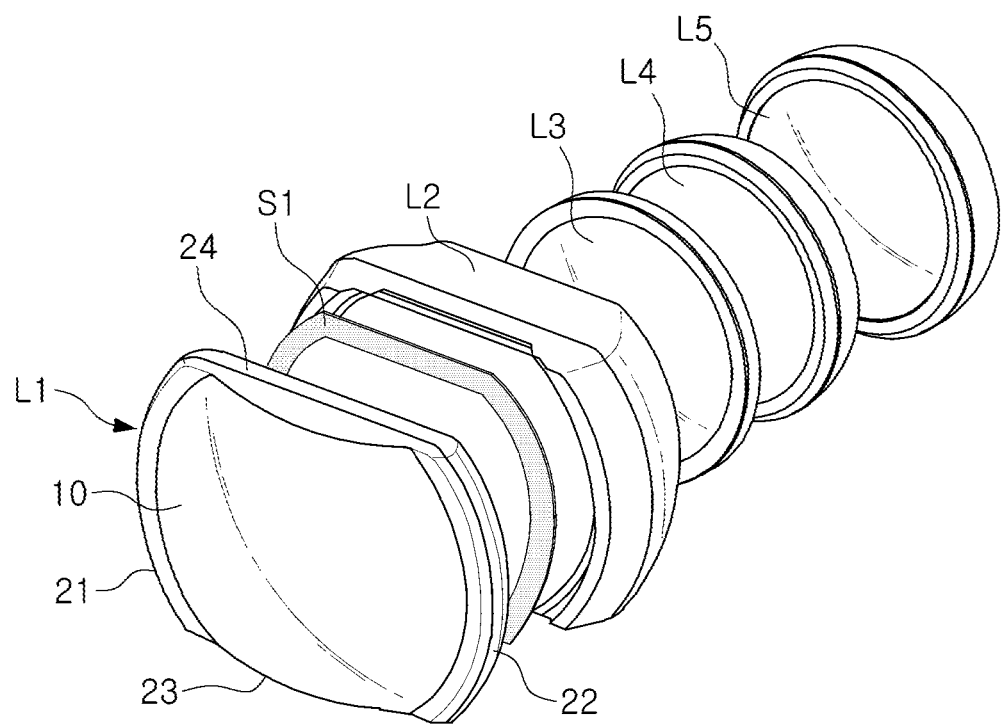
FIG. 15 is a schematic perspective view of an optical imaging system according to an example.
Figure 16:
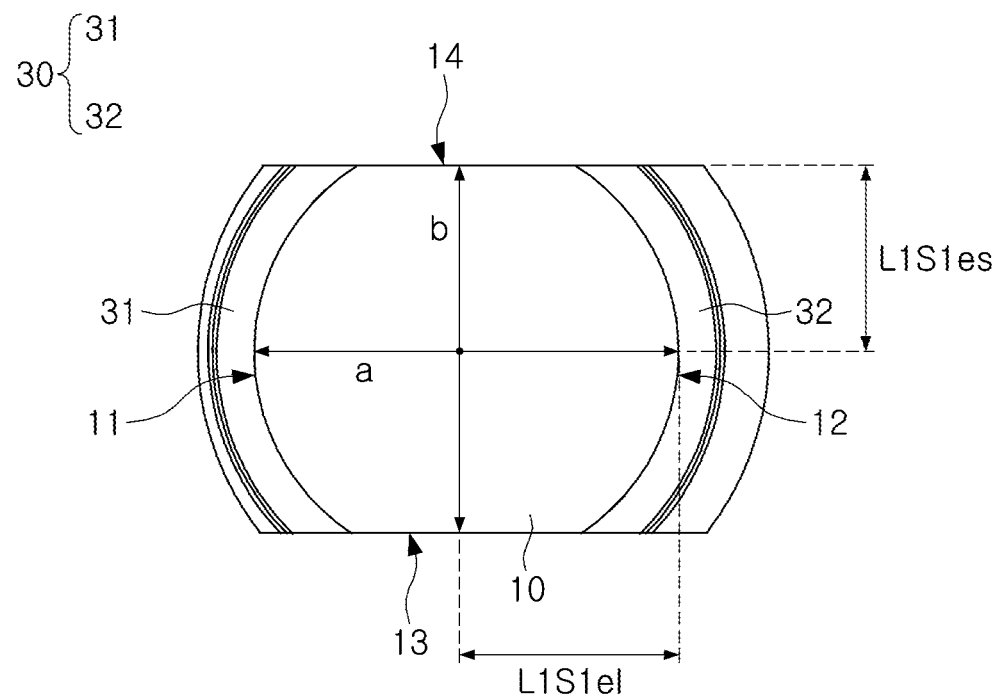
FIGS. 16 and 17 are plan views of a first lens of an optical imaging system according to an example.

Referring to FIGS. 15 and 16, at least some lenses of an optical imaging system may have a non-circular planar shape. For example, at least one of a first lens L1 and a second lens L2 may be formed to have a non-circular shape, and the remaining lenses may be formed to have a circular shape. Alternatively, all lenses of the optical imaging system may be formed to have a non-circular shape.

The term 'non-circular shape' refers that a lens is not circular in a region other than a gate of a plastic injection lens.

The non-circular lens may have four side surfaces, and each of the two side surfaces may be formed to face each other. In addition, the side surfaces facing each other may be provided to have a corresponding shape.

For example, when viewed in an optical axis direction, a first side surface 21 and a second side surface 22 of the first lens L1 may have an arc shape, and a third side surface 23 and a fourth side surface 24 may have a substantially linear shape (see FIG. 15). A gate, a movement path of a resin material, may be formed on either the first side surface 21 or the second side surface 22.

The third side surface 23 and the fourth side surface 24 may connect the first side surface 21 and the second side surface 22, respectively. In addition, the third side surface 23 and the fourth side surface 24 may be symmetrical about the optical axis, and may be formed parallel to each other.

The term 'circular shape' refers to a shape in which a gate of the plastic injection lens is removed (i.e., a shape in which a portion of the circle is cut).

All lenses of the optical imaging system may include an optical portion 10 and a flange portion 30. Hereinafter, a non-circular lens will be described in detail with reference to FIGS. 15 to 17 below.

The first lens L1 and the second lens L2 may have a non-circular shape, but are not limited thereto, and all the lenses may have a non-circular shape.

Hereinafter, for convenience of description, only the first lens L1 will be described.

The optical portion 10 may be a portion in which optical performance of the first lens L1 is exerted. For example, light reflected from the subject may be refracted while passing through the optical portion 10.

The optical portion 10 may have refractive power and may have an aspherical shape.

In addition, the optical portion 10 may include an object-side surface (a surface facing the object side) and an image-side surface (a surface facing the imaging plane) (the object-side surface is illustrated in FIG. 16).

The flange portion 30 may be a portion fixing the first lens L1 to another configuration, for example, a lens barrel or the second lens L2.

The flange portion 30 may extend around at least a portion of the optical portion 10, and may be integrally formed with the optical portion 10.

The optical portion 10 and the flange portion 30 may be formed to have a non-circular shape. For example, the optical portion 10 and the flange portion 30 may be non-circular, when viewed in the optical axis direction (see FIGS. 16 and 17). Unlike this, the optical portion 10 may be formed to have a circular shape, and the flange portion 30 may be formed to have a non-circular shape.

The optical portion 10 may include a first edge 11, a second edge 12, a third edge 13, and a fourth edge 14, and the first edge 11 and the second edge 12 may be located to face each other, and the third edge 13 and the fourth edge 14 may be located to face each other.

The third edge 13 and the fourth edge 14 may connect the first edge 11 and the second edge 12, respectively.

When viewed in the optical axis direction, the first edge 11 and the second edge 12 may have an arc shape, and the third edge 13 and the fourth edge 14 may have a generally linear shape. The third edge 13 and the fourth edge 14 may be formed symmetrical about the optical axis, and may be formed parallel to each other.

The optical portion 10 may have a major axis (a) and a minor axis (b). For example, when viewed in the optical axis direction, a line segment connecting the third edge 13 and the fourth edge 14 at the shortest distance while passing through the optical axis may be the minor axis (b), and a line segment connecting the first edge 11 and the second edge 12 while passing through the optical axis and perpendicular to the minor axis (b) may be the major axis (a).

In this case, half of the major axis (a) may be the maximum effective radius, and half of the minor axis (b) may be the minimum effective radius.

The flange portion 30 may include a first flange portion 31 and a second flange portion 32. The first flange portion 31 may extend from the first edge 11 of the optical portion 10, and the flange portion 32 may extend from the second edge 12 of the optical portion 10.

The first edge 11 of the optical portion 10 may refer to a portion adjacent to the first flange portion 31, and the second edge 12 of the optical portion 10 may refer to a portion adjacent to the second flange portion 32.

The third edge 13 of the optical portion 10 may refer to one side surface of the optical portion 10 on which the flange portion 30 is not formed, and the fourth edge 14 of the optical portion 10 may refer to the other side surface of the optical portion 10 on which the flange portion 30 is not formed.

The first lens L1 may be formed of a plastic material and may be injection-molded through a mold. In this case, the third edge 13 and the fourth edge 14 of the first lens L1 may be not formed by cutting a portion of the lens after injection-molding, but are formed to have such a shape in the injection-molding.

When a portion of the lens is removed after injection-molding, the lens may be deformed by force applied to the lens. In a case in which the lens is deformed, optical performance of the lens is changed, which may be problematic.

However, in the first lens L1 according to the example, since the first lens L1 is formed to have a non-circular shape when the first lens L1 is injected, a size of the first lens L1 may be reduced, while securing performance of the first lens L1.

In this example, an effective radius of the non-circular lens may be formed to be larger than an effective radius of other lenses.

The effective radius refers to a radius of one surface (an object-side surface and an image-side surface) of each lens through which light actually passes. For example, the effective radius refers to a radius of the optical portion of each lens.

Since the first lens L1 is non-circular, an effective radius of the first lens L1 may have a maximum effective radius, corresponding to half of a virtual straight line connecting the first edge 11 and the second edge 12 while passing through an optical axis, and a minimum effective radius, corresponding to half of a virtual straight line connecting the third edge 13 and the fourth edge 14 while passing through the optical axis.

Figure 17:
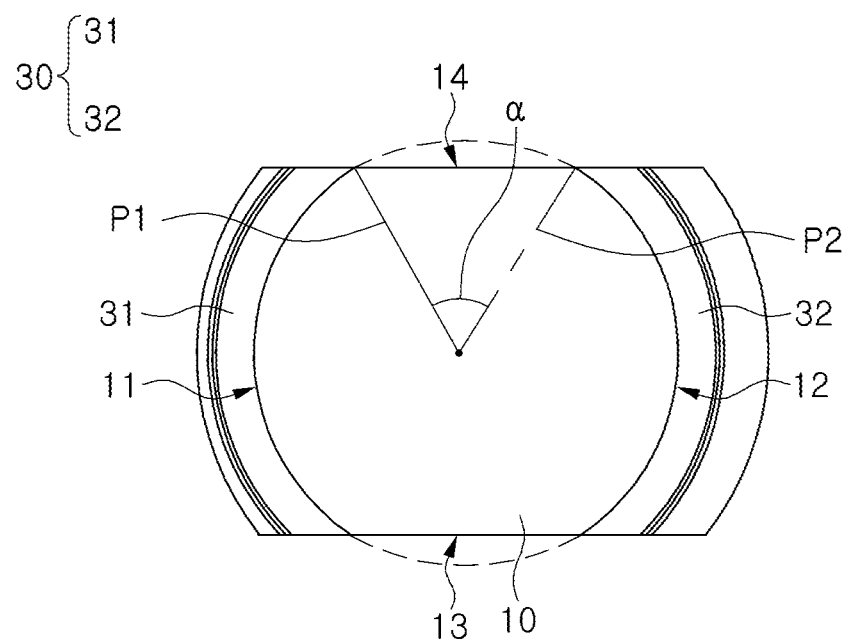

Referring to FIG. 17, a first virtual line connecting the optical axis from a connection point between the first edge 11 and the fourth edge 14 or the third edge 13 of the non-circular lens may be defined as P1, a second virtual line connecting the optical axis from a connection point between the second edge 12 and the fourth edge 14 or the third edge 13 of the non-circular lens may be defined as P2, and an angle between the two virtual lines may be defined as $\alpha$.

Each of the plurality of lenses may have at least one aspheric surface.

For example, at least one of the first surface and the second surface of each of the first lens to the fifth lens may be an aspheric surface. In this case, the aspheric surfaces of the first lens to the fifth lens are represented by the following equation 1.

$$Z = \frac{cY^2}{1+\sqrt{1-(1+K)c^2Y^2}} + AY^4 + BY^6 + CY^8 + DY^{10} + EY^{12} \ldots \quad \text{Equation 1}$$

In Equation 1, c is curvature of the lens (inverse of a curvature radius), K is a conic constant, and Y is a distance from an arbitrary point on an aspheric surface of the lens to an optical axis. In addition, constants A to E are aspheric coefficients. Z represents a distance (SAG) from an arbitrary point on the aspheric surface of the lens to an apex of the aspheric surface.

An optical imaging system according to various examples may satisfy at least one of the following conditional expressions:

| | |
|---|---|
| $0.65 < L1S1es/L1S1el < 0.9$ | Conditional Expression 1: |
| $0.65 < L1S2es/L1S2el < 0.9$ | Conditional Expression 2: |
| $0.7 < L2S1es/L2S1el < 0.9$ | Conditional Expression 3: |
| $0.7 < L2S2es/L2S2el < 1.0$ | Conditional Expression 4: |
| $0.9 \text{ mm} < DpL1 < 1.5 \text{ mm}$ | Conditional Expression 5: |
| $15.0 \text{ mm} < PTTL < 25.0 \text{ mm}$ | Conditional Expression 6: |
| $0.7 < s1es/s1el < 0.9$ | Conditional Expression 7: |
| $0.8 < L1S1el/IMG\ HT < 1.2$ | Conditional Expression 8: |
| $0 < L1S1el/PTTL < 0.2$ | Conditional Expression 9: |
| $0 < L1S1es/PTTL < 0.15$ | Conditional Expression 10: |
| $0 < L2S1el/PTTL < 0.17$ | Conditional Expression 11: |
| $0 < L2S1es/PTTL < 0.14$ | Conditional Expression 12: |
| $0 < AL1/(PTTL)^2 < 0.09$ | Conditional Expression 13: |
| $50° < \alpha < 92°$ | Conditional Expression 14: |
| $1.3 < \alpha/(2*FOV) < 2.2$ | Conditional Expression 15: |
| $0.9 < BFL/(2*IMG\ HT) < 3.0$ | Conditional Expression 16: |
| $2.4 \leq Fno < 5$ | Conditional Expression 17: |
| $1.3 < L1S1el/L5S2el < 1.7$ | Conditional Expression 18: |
| $1.3 < L1S1el/L3S1el < 1.7$ | Conditional Expression 19: |
| $0.8 < L3S1el/L5S1el < 1.2$ | Conditional Expression 20: |
| $-0.7 \text{ mm} < f1+f2 < 1.3 \text{ mm}$ | Conditional Expression 21: |
| $0.87 < TTL/f < 1.31$ | Conditional Expression 22: |
| $4.5 < TTL/IMG\ HT < 6.5$ | Conditional Expression 23: |
| $0.5 < L1S1es/IMG\ HT < 1.1$ | Conditional Expression 24: |
| $0.5 < L3S1el/IMG\ HT < 1.1$ | Conditional Expression 25: |
| $0.5 < L5S2el/IMG\ HT < 1.3$ | Conditional Expression 26: |
| $1.1 < sumCT/sumET < 1.4$ | Conditional Expression 27: |
| $1.3 < (CT5/ET5)*L5S1el < 2.5$ | Conditional Expression 28: |
| $-0.2 < SAG51/IMG\ HT < 0.2$ | Conditional Expression 29: |
| $-0.1 < SAG52/IMG\ HT < 0.1$ | Conditional Expression 30: |
| $FOV < 25°$ | Conditional Expression 31: |

In the conditional expressions, L1S1el is the maximum effective radius of the object-side surface of the first lens, L1S1es is the minimum effective radius of the object-side surface of the first lens, L1S2el is the maximum effective radius of the image-side surface of the first lens, and L1S2es is the minimum effective radius of the image-side surface of the first lens.

In the conditional expressions, L2S1el is the maximum effective radius of the object-side surface of the second lens, L2S1es is the minimum effective radius of the object-side surface of the second lens, L2S2el is the maximum effective radius of the image-side surface of the second lens, and L2S2es is the minimum effective radius of the image-side surface of the second lens.

In the conditional expressions, L3S1el is the maximum effective radius of the object-side surface of the third lens, and L5S2el is the maximum effective radius of the image-side surface of the fifth lens.

In the conditional expressions, DpL1 is a distance between an exit surface of a prism and the object-side surface of the first lens along the optical axis, TTL is a distance from the object-side surface of the first lens to the imaging surface of the image sensor along the optical axis, and PTTL is a distance from the reflective surface of the prism to the imaging surface of the image sensor along the optical axis.

In the conditional expressions, s1el is the maximum radius of an opening of a spacer disposed between the first lens and the second lens, and s1es is the minimum radius of the opening of the spacer disposed between the first lens and the second lens.

In the conditional expressions, IMG HT is half a diagonal length of the imaging surface of the image sensor.

In the conditional expressions, AL1 is an area of the optical portion of the object-side surface of the first lens. In this case, the area means an area of a plane viewed when the first lens is viewed in the optical axis direction (see FIG. 16).

In the conditional expressions, a is an angle between a first virtual line P1 connecting the optical axis (a Z-axis) from a connection point of the first side surface 21 and the fourth side surface 24 of the first lens, and a second virtual line P2 connecting the optical axis (the Z-axis) from a connection point of the second side surface 22 and the fourth side surface 24 of the first lens.

In the conditional expressions, FOV is an angle of view of the optical imaging system, f is the total focal length of the optical imaging system, and BFL is a distance from the image-side surface of the lens disposed closest to the image sensor to the image-side surface of the image sensor along the optical axis.

In the conditional expressions, Fno is the F-number of the optical imaging system.

In the conditional expressions, f1 is a focal length of the first lens, and f2 is a focal length of the second lens.

In the conditional expressions, sumCT is the sum of the thicknesses on the optical axis of the first to fifth lenses, and sumET is the sum of the edge thicknesses of the first to fifth lenses. In this case, the edge of the lens refers to an end of the optical portion.

In the conditional expressions, CT5 is a thickness on the optical axis of the fifth lens, and ET5 is a thickness of the edge of the fifth lens.

In the conditional expressions, SAG51 is an SAG value at the edge of the object-side surface of the fifth lens, and SAG52 is an SAG value at the edge of the image-side surface of the fifth lens.

Next, first to fifth lenses constituting an optical imaging system according to various examples will be described.

The first lens may have positive refractive power. In addition, both surfaces of the first lens may be convex. For example, a first surface and a second surface of the first lens may be convex.

In the first lens, at least one surface of a first surface and a second surface may be aspherical. For example, both surfaces of the first lens may be aspherical.

The second lens may have negative refractive power. In addition, the second lens may have a meniscus shape convex toward the object side. For example, a first surface of the second lens may be convex, and a second surface of the second lens may be concave.

Alternatively, both surfaces of the second lens may be concave. For example, first and second surfaces of the second lens may be concave.

In the second lens, at least one surface of a first surface and a second surface may be aspherical. For example, both surfaces of the second lens may be aspherical.

The third lens may have positive or negative refractive power. In addition, the third lens may have a meniscus shape convex toward the object side. For example, a first surface of the third lens may be convex, and a second surface of the third lens may be concave.

Alternatively, the third lens may have a convex shape on both sides. For example, first and second surfaces of the third lens may be convex.

In the third lens, at least one surface of a first surface and a second surface may be aspherical. For example, both surfaces of the third lens may be aspherical.

The fourth lens may have positive or negative refractive power. In addition, the fourth lens may have a meniscus shape convex toward the object side. For example, a first surface of the fourth lens may be convex, and a second surface of the fourth lens may be concave.

Alternatively, both surfaces of the fourth lens may be concave. For example, first and second surfaces of the fourth lens may be concave.

Alternatively, the fourth lens may have a meniscus shape convex toward the image side. For example, a first surface of the fourth lens may be concave, and a second surface of the fourth lens may be convex.

In the fourth lens, at least one surface of a first surface and a second surface may be aspherical. For example, both surfaces of the fourth lens may be aspherical.

The fifth lens may have positive or negative refractive power. In addition, the fifth lens may have a meniscus shape convex toward the object side. For example, a first surface of the fifth lens may be convex, and a second surface may be concave.

In the fifth lens, at least one surface of a first surface and a second surface may be aspherical. For example, both surfaces of the fifth lens may be aspherical.

The optical imaging system according to the various examples has a feature of a telephoto lens having a relatively narrow angle of view and a relatively long focal length.

An optical imaging system according to a first example will be described with reference to FIGS. 1 and 2.

The optical imaging system 100 includes an optical system including a first lens 110, a second lens 120, a third lens 130, a fourth lens 140, and a fifth lens 150, and may further include a filter 160 and an image sensor 170.

A first reflective member R1 disposed closer to an object side than the first lens 110 and having a reflective surface changing an optical path may be further included. A second reflective member R2 disposed between the fifth lens 150 and the filter 160 and having a reflective surface changing an optical path may be further included. The first reflective member R1 and the second reflective member R2 may be prisms, but may also be provided as mirrors.

Light incident on the first reflective member R1 may be bent by the first reflective member R1 to pass through the first lens 110 to the fifth lens 150.

Light passing through the first lens 110 to the fifth lens 150 may be bent by the second reflective member R2 and may be received by the image sensor 170.

Lens characteristics of each lens (radius of curvature, a thickness of a lens or a distance between lenses, a refractive index, Abbe number, a focal length) are illustrated in the following Table 1.

TABLE 1

| Surface No. | Remarks | Curvature Radius | Thickness or Distance | Refractive Index | Abbe No. | Maximum Effective Radius | Minimum Effective Radius |
|---|---|---|---|---|---|---|---|
| S1 | 1st Prism | Infinity | 2.250 | 1.723 | 29.50 | 2.3 | — |
| S2 | | Infinity | 2.250 | 1.723 | 29.50 | 3.300 | — |
| S3 | | Infinity | 1.320 | | | 2.3 | — |
| S4 | 1st Lens | 4.172 | 2.262939 | 1.537 | 55.65 | 2.700 | 2.248 |
| S5 | | −5.486 | 0.03 | | | 2.481 | 2.050 |
| S6 | 2nd Lens | −7.809 | 1.023728 | 1.621 | 25.96 | 2.366 | 2.016 |
| S7 | | 3.320 | 0.311996 | | | 1.939 | 1.797 |
| S8 | 3rd Lens | 5.461 | 1.860203 | 1.679 | 19.24 | 1.918 | 1.796 |
| S9 | | −62.307 | 0.999982 | | | 1.698 | 1.684 |
| S10 | 4th Lens | −7.500 | 0.652353 | 1.621 | 25.96 | 1.565 | 1.459 |
| S11 | | −20.523 | 0.036444 | | | 1.601 | 1.424 |
| S12 | 5th Lens | 13.646 | 0.943852 | 1.547 | 56.11 | 1.605 | 1.423 |
| S13 | | 6.769 | 1 | | | 1.673 | 1.398 |
| S14 | 2nd Prism | Infinity | 0.7 | 1.723 | 29.50 | 0.7 | — |
| S15 | | Infinity | 0.7 | 1.723 | 29.50 | 1 | — |
| S16 | | Infinity | 1 | | | 0.7 | — |
| S17 | Filter | Infinity | 0.11 | | | — | — |
| S18 | | Infinity | 3.384 | | | — | — |
| S19 | Imaging Surface | Infinity | | | | — | — |

In the optical imaging system 100, the total focal length f is 15.5 mm, Fno is 2.96, IMG HT is 2.48 mm, FOV is 17.86°, α is 67.26°, AL1 is 21.068 mm², BFL is 6.894 mm, TTL is 15.016 mm, and PTTL is 18.5855 mm. An edge thickness of the fifth lens 150 is 1.02 mm, an SAG value SAG51 of the object-side surface of the fifth lens 150 is 0.02 mm, and an SAG value SAG52 of the image-side surface of the fifth lens 150 is 0.1 mm.

A focal length of the first lens 110 is 4.80967 mm, a focal length of the second lens 120 is −3.62625 mm, a focal length of the third lens 130 is 7.4794 mm, a focal length of the fourth lens 140 is −19.4173 mm, and a focal length of the fifth lens 150 is −25.8321 mm.

In the optical imaging system 100, the first lens 110 has positive refractive power, and first and second surfaces of the first lens 110 are convex.

The second lens 120 has negative refractive power, and first and second surfaces of the second lens 120 are concave.

The third lens 130 has positive refractive power, and first and second surfaces of the third lens 130 are convex.

The fourth lens 140 has negative refractive power, a first surface of the fourth lens 140 is concave, and a second surface of the fourth lens 140 is convex.

The fifth lens 150 has negative refractive power, a first surface of the fifth lens 150 is convex, and a second surface of the fifth lens 150 is concave.

Respective surfaces of the first lens 110 to the fifth lens 150 have an aspheric surface coefficient as illustrated in Table 2. For example, both the object-side surface and the image-side surface of the first lens 110 to the fifth lens 150 are aspheric surfaces.

TABLE 2

| | K | A | B | C | D | E |
|---|---|---|---|---|---|---|
| S4 | −7.61E−01 | 6.62E−04 | 8.60E−05 | −3.00E−06 | 1.00E−06 | −1.14E−07 |
| S5 | 0 | 4.55E−03 | −1.50E−04 | −1.60E−05 | 3.00E−06 | −1.36E−07 |
| S6 | 0 | −2.46E−03 | 4.41E−04 | −4.70E−05 | 6.00E−06 | −2.89E−07 |
| S7 | 0 | −1.45E−02 | 1.79E−03 | −5.00E−04 | 8.60E−05 | −1.30E−05 |
| S8 | 0 | −8.32E−03 | 2.58E−03 | −7.44E−04 | 1.02E−04 | −1.40E−05 |
| S9 | 0 | −8.68E−03 | 3.34E−03 | −1.25E−03 | 1.59E−04 | −7.00E−06 |
| S10 | 0 | 1.55E−02 | −3.86E−03 | −1.73E−03 | 3.92E−04 | −1.70E−05 |
| S11 | 0 | 2.12E−02 | −4.00E−03 | 1.44E−04 | 3.32E−04 | −1.13E−04 |
| S12 | 0 | −2.45E−02 | 3.35E−03 | 2.20E−03 | −4.85E−04 | −3.90E−05 |
| S13 | 0 | −2.48E−02 | 5.47E−03 | −6.46E−04 | −2.00E−05 | 1.10E−05 |

Figure 2:
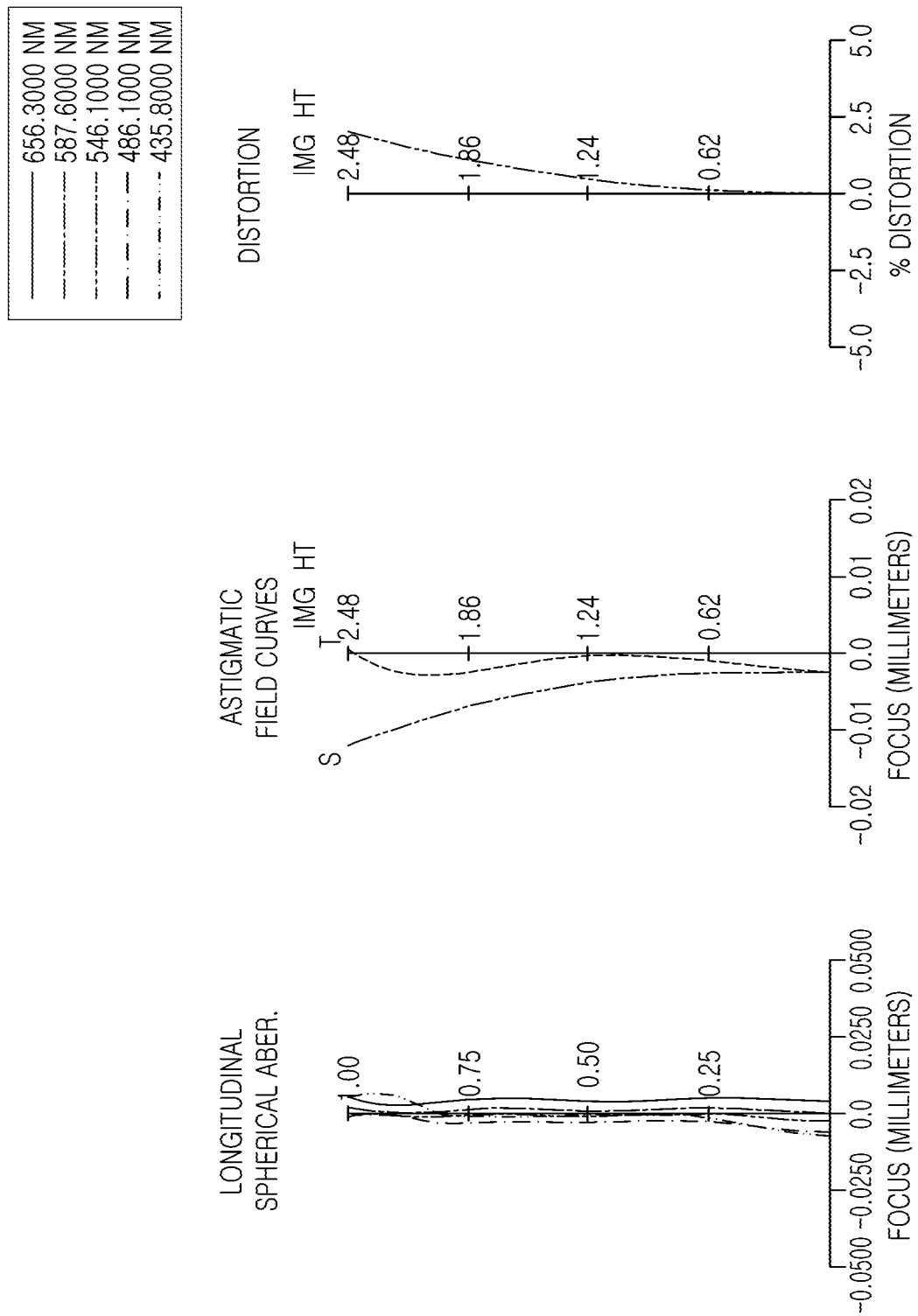
FIG. 2 is a curve illustrating aberration characteristics of the optical imaging system illustrated in FIG. 1.

In addition, the optical system configured as described above may have aberration characteristics as illustrated in FIG. 2.

Figure 3:
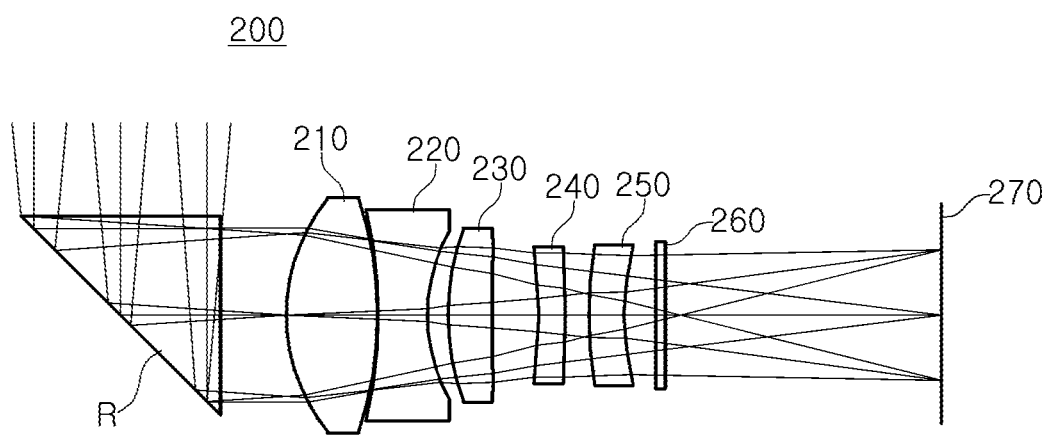
FIG. 3 is a configuration diagram of an optical imaging system according to a second example.

An optical imaging system according to a second example will be described with reference to FIGS. 3 and 4.

The optical imaging system 200 may include an optical system including a first lens 210, a second lens 220, a third lens 230, a fourth lens 240, and a fifth lens 250, and may further include a filter 260 and an image sensor 270.

A reflective member R disposed closer to an object side than the first lens 210 and having a reflective surface changing an optical path may be further included. The reflective member R may be a prism, but may also be provided as a mirror.

Light incident on the reflective member R may be bent by the reflective member R to pass through the first lens 210 to the fifth lens 250.

Lens characteristics of each lens (radius of curvature, a thickness of a lens or a distance between lenses, a refractive index, Abbe number, a focal length) are illustrated in the following Table 3.

TABLE 3

| Surface No. | Remarks | Curvature Radius | Thickness or Distance | Refractive Index | Abbe No. | Maximum Effective Radius | Minimum Effective Radius |
|---|---|---|---|---|---|---|---|
| S1 | Prism | Infinity | 2.250 | 1.5167 | 64.17 | 2.3 | — |
| S2 |  | Infinity | 2.250 | 1.5167 | 64.17 | 3.300 | — |
| S3 |  | Infinity | 1.320 |  |  | 2.3 | — |
| S4 | 1$^{st}$ Lens | 4.3055148 | 2.097525903 | 1.5370 | 55.65 | 2.700 | 2.384 |
| S5 |  | −6.714204 | 0.03 |  |  | 2.502 | 2.213 |
| S6 | 2$^{nd}$ Lens | −12.16678 | 1.085867503 | 1.6210 | 25.96 | 2.436 | 2.173 |
| S7 |  | 3.1920995 | 0.504703411 |  |  | 2.017 | 1.925 |
| S8 | 3$^{rd}$ Lens | 4.9956293 | 0.997351518 | 1.6790 | 19.24 | 1.995 | 1.944 |
| S9 |  | 21.330181 | 1.065128428 |  |  | 1.891 | 1.891 |
| S10 | 4$^{th}$ Lens | −7.054019 | 0.603792113 | 1.6210 | 25.96 | 1.826 | 1.729 |
| S11 |  | −9.429218 | 0.542997795 |  |  | 1.847 | 1.700 |
| S12 | 5$^{th}$ Lens | 5.1910303 | 0.791118154 | 1.5470 | 56.11 | 1.879 | 1.649 |
| S13 |  | 3.8872349 | 0.724277581 |  |  | 1.925 | 1.597 |
| S14 | Filter | Infinity | 0.21 |  |  | 1.98541949 | 1.595 |
| S15 |  | Infinity | 6.347198679 |  |  | 2.00309938 | 1.595 |
| S16 | Imaging Surface | Infinity |  |  |  | 2.82208927 | 1.570 |

In the optical imaging system 200, the total focal length f is 16 mm, Fno is 2.96, IMG HT is 2.822 mm, FOV is 18.3°, α is 56.004°, AL1 is 21.821 mm², BFL is 7.281 mm, TTL is 15 mm, and PTTL is 18.57 mm. An edge thickness of the fifth lens 250 is 0.91 mm, an SAG value SAG51 of the object-side surface of the fifth lens 250 is 0.13 mm, and an SAG value SAG52 of the image-side surface of the fifth lens 250 is 0.26 mm.

A focal length of the first lens 210 is 5.23686 mm, a focal length of the second lens 220 is −3.96715 mm, a focal length of the third lens 230 is 9.37747 mm, a focal length of the fourth lens 240 is −49.9896 mm, and a focal length of the fifth lens 250 is −36.0501 mm.

The first lens 210 has positive refractive power, and first and second surfaces of the first lens 210 are convex.

The second lens 220 has negative refractive power, and first and second surfaces of the second lens 220 are concave.

The third lens 230 has positive refractive power, a first surface of the third lens 230 is convex, and a second surface of the third lens 230 is concave.

The fourth lens 240 has negative refractive power, a first surface of the fourth lens 240 is concave, and a second surface of the fourth lens 240 is convex.

The fifth lens 250 has negative refractive power, a first surface of the fifth lens 250 is convex, and a second surface of the fifth lens 250 is concave.

Respective surfaces of the first lens 210 to the fifth lens 250 have an aspheric surface coefficient as illustrated in Table 4. For example, both the object-side surface and the image-side surface of the first lens 210 to the fifth lens 250 are aspheric surfaces.

TABLE 4

|  | K | A | B | C | D | E |
|---|---|---|---|---|---|---|
| S4 | −7.71E−01 | 6.38E−04 | 1.00E−04 | −9.00E−06 | 2.00E−06 | −1.38E−07 |
| S5 | 0 | 4.43E−03 | −2.25E−04 | −1.90E−05 | 3.00E−06 | −8.74E−08 |
| S6 | 0 | −2.82E−03 | 4.10E−04 | −5.80E−05 | 6.00E−06 | −1.93E−07 |
| S7 | 0 | −1.34E−02 | 1.34E−03 | −4.04E−04 | 9.20E−05 | −9.00E−06 |
| S8 | 0 | −8.91E−03 | 2.81E−03 | −8.13E−04 | 1.20E−04 | −8.00E−06 |
| S9 | 0 | −9.23E−03 | 3.66E−03 | −1.21E−03 | 1.61E−04 | −7.00E−06 |
| S10 | 0 | 1.71E−02 | −2.51E−03 | −2.38E−04 | 3.00E−06 | 1.00E−05 |
| S11 | 0 | 1.75E−02 | −1.94E−03 | 1.51E−04 | −6.40E−05 | 8.00E−06 |
| S12 | 0 | −2.41E−02 | 2.39E−03 | 2.78E−04 | −1.47E−04 | 8.00E−06 |
| S13 | 0 | −2.69E−02 | 3.80E−03 | −3.71E−04 | −2.60E−05 | 4.00E−06 |

Figure 4:
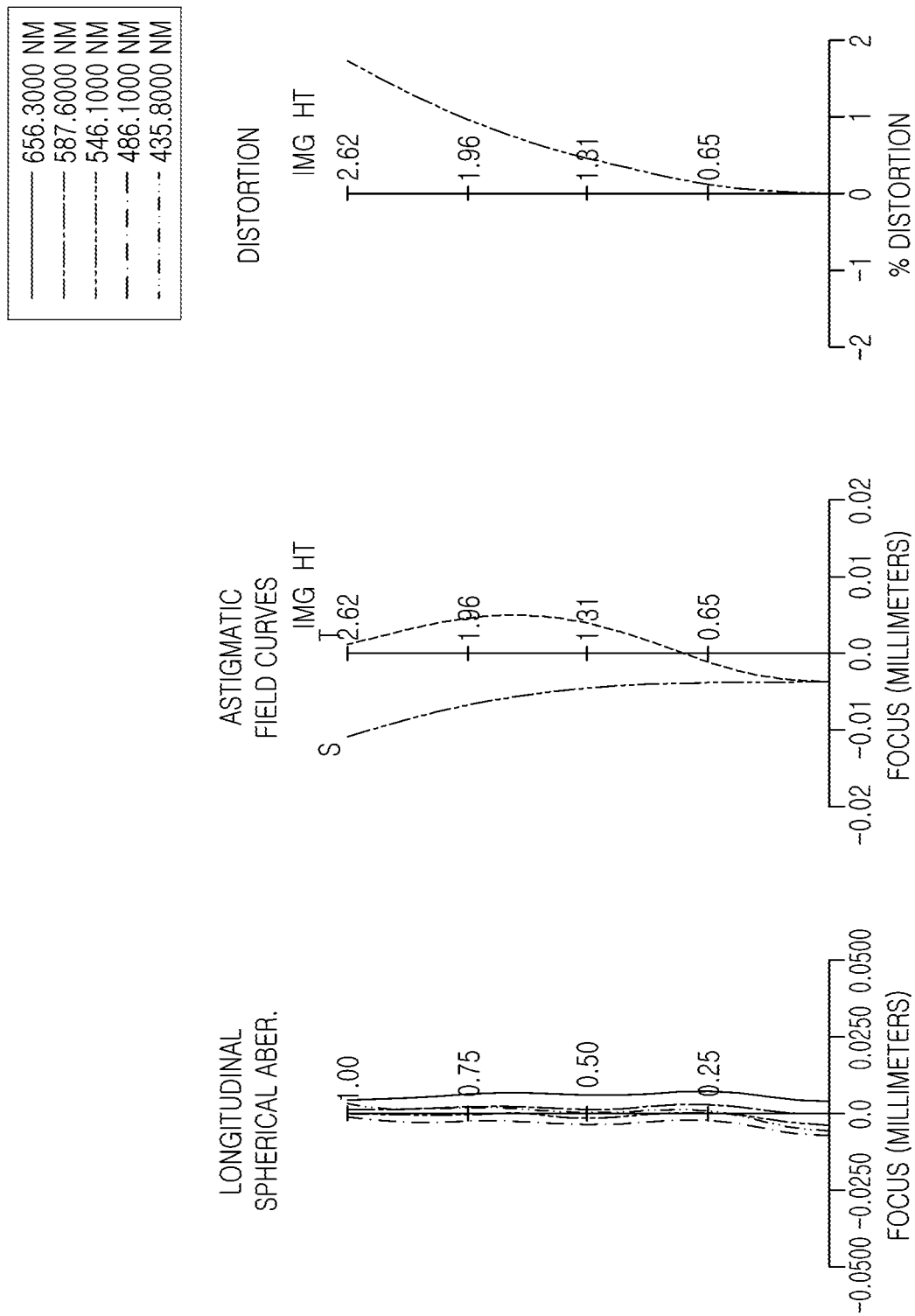
FIG. 4 is a curve illustrating aberration characteristics of the optical imaging system illustrated in FIG. 3.

In addition, the optical system 200 may have aberration characteristics as illustrated in FIG. 4.

Figure 5:
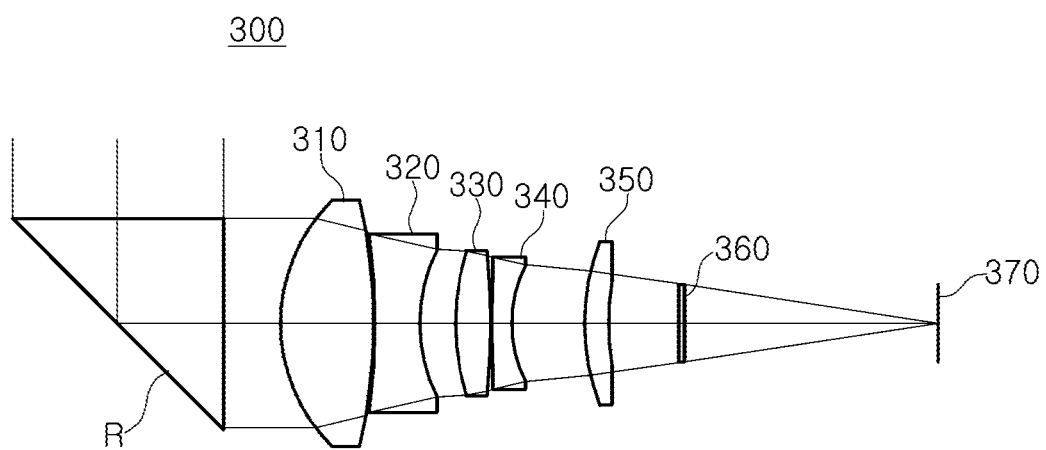
FIG. 5 is a configuration diagram of an optical imaging system according to a third example.

An optical imaging system according to a third example will be described with reference to FIGS. 5 and 6.

The optical imaging system 300 may include an optical system including a first lens 310, a second lens 320, a third lens 330, a fourth lens 340, and a fifth lens 350, and may further include a filter 360 and an image sensor 370.

A reflective member R disposed closer to an object side than the first lens 310 and having a reflective surface changing an optical path may be further included. The reflective member R may be a prism, but may also be provided as a mirror.

Light incident on the reflective member R may be bent by the reflective member R to pass through the first lens 310 to the fifth lens 350.

Lens characteristics of each lens (radius of curvature, a thickness of a lens or a distance between lenses, a refractive index, Abbe number, a focal length) are illustrated in the following Table 5.

TABLE 5

| Surface No. | Remarks | Curvature Radius | Thickness or Distance | Refractive Index | Abbe No. | Maximum Effective Radius | Minimum Effective Radius |
|---|---|---|---|---|---|---|---|
| S1 | Prism | Infinity | 2.250 | 1.5167 | 64.17 | 2.3 | — |
| S2 | | Infinity | 2.250 | 1.5167 | 64.17 | 3.300 | — |
| S3 | | Infinity | 1.000 | | | 2.3 | — |
| S4 | 1$^{st}$ Lens | 3.8431725 | 2.022982102 | 1.5370 | 55.65 | 2.720 | 2.158 |
| S5 | | −8.382301 | 0.037430756 | | | 2.522 | 1.970 |
| S6 | 2$^{nd}$ Lens | −27.19506 | 0.967253417 | 1.6210 | 25.96 | 2.438 | 1.930 |
| S7 | | 3.1050234 | 0.78494493 | | | 1.952 | 1.706 |
| S8 | 3$^{rd}$ Lens | 4.7537732 | 0.771870558 | 1.6790 | 19.24 | 1.891 | 1.739 |
| S9 | | −50.87882 | 0.038269366 | | | 1.853 | 1.702 |
| S10 | 4$^{th}$ Lens | 14.520609 | 0.45 | 1.6210 | 25.96 | 1.797 | 1.662 |
| S11 | | 2.878257 | 1.576073001 | | | 1.647 | 1.541 |
| S12 | 5$^{th}$ Lens | 4.0295198 | 0.535140688 | 1.5470 | 56.11 | 1.800 | 1.688 |
| S13 | | 5.5923437 | 1.657499029 | | | 1.805 | 1.659 |
| S14 | Filter | Infinity | 0.11 | | | 2.07545089 | 1.680 |
| S15 | | Infinity | 5.548537685 | | | 2.0889549 | 1.681 |
| S16 | Imaging Surface | Infinity | | | | 3.13647384 | 1.760 |

In the optical imaging system 300, the total focal length f is 15.6 mm, Fno is 2.87, IMG HT is 3.136 mm, FOV is 21.1°, α is 75.011°, AL1 is 20.704 mm$^2$, BFL is 7.316 mm, TTL is 14.5 mm, and PTTL is 17.75 mm. An edge thickness of the fifth lens 350 is 0.41 mm, an SAG value SAG51 of the object-side surface of the fifth lens 350 is 0.35 mm, and an SAG value SAG52 of the image-side surface of the fifth lens 350 is 0.23 mm.

A focal length of the first lens 310 is 5.2118 mm, a focal length of the second lens 320 is −4.43632 mm, a focal length of the third lens 330 is 6.44006 mm, a focal length of the fourth lens 340 is −5.87135 mm, and a focal length of the fifth lens 350 is 23.5364 mm.

The first lens 310 has positive refractive power, and first and second surfaces of the first lens 310 are convex.

The second lens 320 has negative refractive power, and first and second surfaces of the second lens 320 are concave.

The third lens 330 has positive refractive power, and first and second surfaces of the third lens 330 are convex.

The fourth lens 340 has negative refractive power, a first surface of the fourth lens 340 is convex, and a second surface of the fourth lens 340 is concave.

The fifth lens 350 has positive refractive power, a first surface of the fifth lens 350 is convex, and a second surface of the fifth lens 350 is concave.

Figure 6:
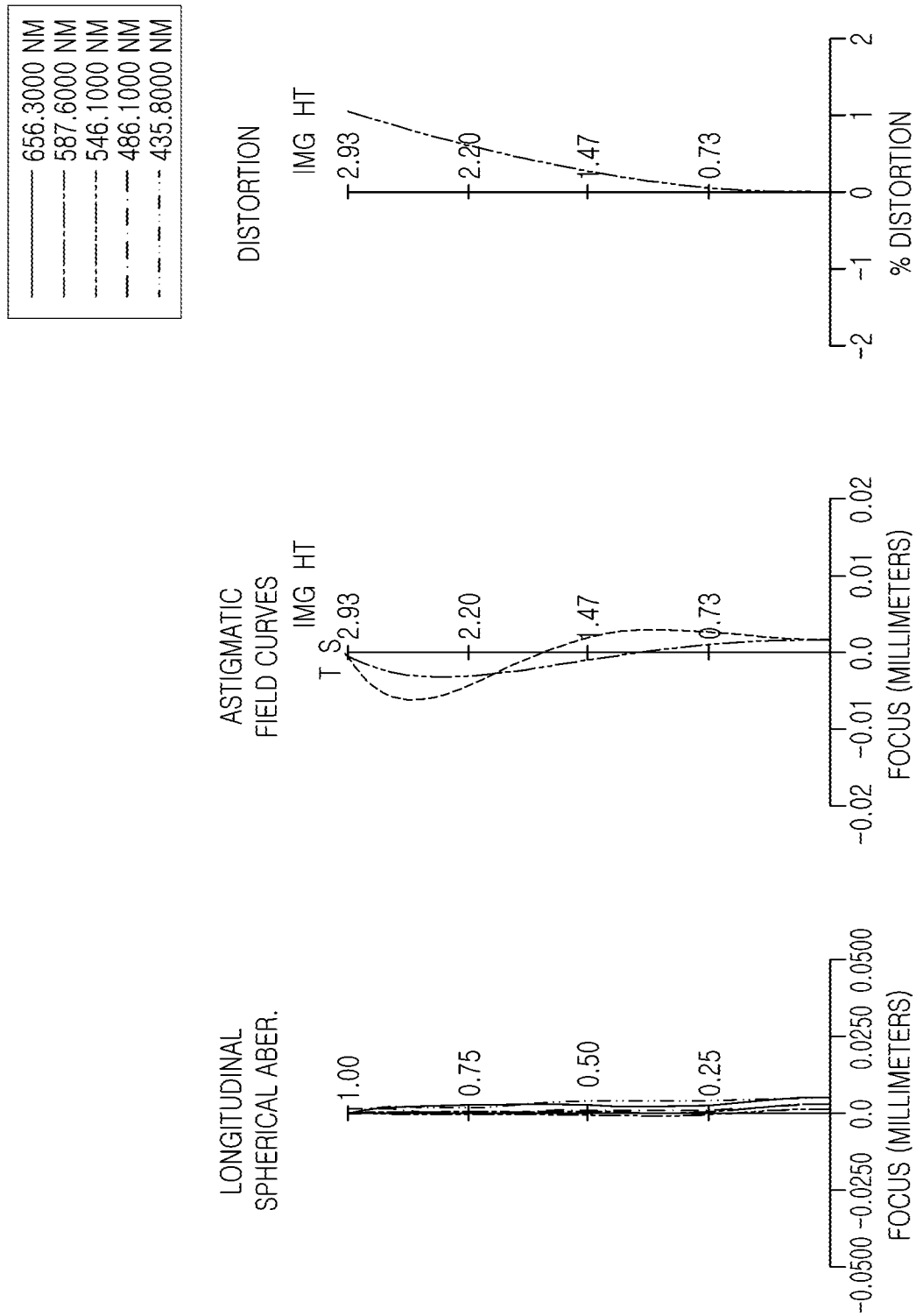
FIG. 6 is a curve illustrating aberration characteristics of the optical imaging system illustrated in FIG. 5.

Respective surfaces of the first lens 310 to the fifth lens 350 have an aspheric surface coefficient as illustrated in FIG. 6. For example, both the object-side surface and the image-side surface of the first lens 310 to the fifth lens 350 are aspheric surfaces.

TABLE 6

| | K | A | B | C | D | E |
|---|---|---|---|---|---|---|
| S4 | −6.22E−01 | 1.05E−03 | 9.70E−05 | −3.28E−07 | 1.00E−06 | −3.04E−08 |
| S5 | 0 | 2.81E−03 | −1.00E−06 | 3.82E−07 | −2.00E−06 | 1.19E−07 |
| S6 | 0 | −5.66E−03 | 7.69E−04 | −6.10E−05 | 3.00E−06 | −1.42E−08 |

TABLE 6-continued

|  | K | A | B | C | D | E |
|---|---|---|---|---|---|---|
| S7 | 0 | −1.13E−02 | 6.58E−04 | −2.07E−04 | 5.70E−05 | −3.00E−06 |
| S8 | 0 | −8.52E−03 | 1.48E−03 | −1.89E−04 | −1.70E−05 | 9.00E−06 |
| S9 | 0 | −1.14E−02 | 2.43E−03 | −3.78E−04 | 5.00E−06 | 5.00E−06 |
| S10 | 0 | −1.11E−02 | −1.90E−05 | 7.37E−04 | −1.93E−04 | 1.20E−05 |
| S11 | 0 | −1.43E−02 | 1.16E−03 | 8.73E−04 | −1.35E−04 | −8.00E−06 |
| S12 | 0 | −1.70E−02 | 1.38E−03 | 3.83E−04 | 1.20E−05 | −3.00E−06 |
| S13 | 0 | −1.42E−02 | 7.24E−04 | 4.82E−04 | −6.50E−05 | 1.30E−05 |

In addition, the optical system configured as described above may have aberration characteristics as illustrated in FIG. 6.

Figure 7:
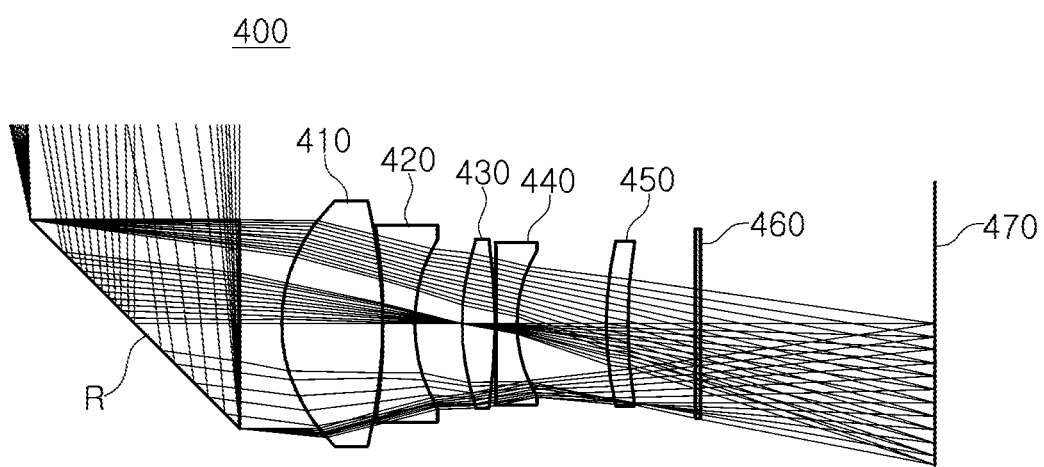
FIG. 7 is a configuration diagram of an optical imaging system according to a fourth example.

An optical imaging system according to a fourth example will be described with reference to FIGS. 7 and 8.

The optical imaging system 400 may include an optical system including a first lens 410, a second lens 420, a third lens 430, a fourth lens 440, and a fifth lens 450, and may further include a filter 460 and an image sensor 470.

A reflective member R disposed closer to an object side than the first lens 410 and having a reflective surface changing an optical path may be further included. The reflective member R may be a prism, but may also be provided as a mirror.

Light incident on the reflective member R may be bent by the reflective member R to pass through the first lens 410 to the fifth lens 450.

Lens characteristics of each lens (radius of curvature, a thickness of a lens or a distance between lenses, a refractive index, Abbe number, a focal length) are illustrated in the following Table 7.

TABLE 7

| Surface No. | Remarks | Curvature Radius | Thickness or Distance | Refractive Index | Abbe No. | Maximum Effective Radius | Minimum Effective Radius |
|---|---|---|---|---|---|---|---|
| S1 | Prism | Infinity | 2.250 | 1.5167 | 64.17 | 2.3 | — |
| S2 |  | Infinity | 2.250 | 1.5167 | 64.17 | 3.300 | — |
| S3 |  | Infinity | 1.000 |  |  | 2.3 | — |
| S4 | 1$^{st}$ Lens | 3.6580184 | 2.192111929 | 1.5370 | 55.65 | 2.720 | 2.194 |
| S5 |  | −8.045381 | 0.03 |  |  | 2.565 | 1.965 |
| S6 | 2$^{nd}$ Lens | −23.99666 | 0.670690874 | 1.6210 | 25.96 | 2.476 | 1.924 |
| S7 |  | 3.2131039 | 1.035816031 |  |  | 2.012 | 1.723 |
| S8 | 3$^{rd}$ Lens | 4.8338373 | 0.747960385 | 1.6790 | 19.24 | 1.900 | 1.742 |
| S9 |  | −52.08516 | 0.03 |  |  | 1.850 | 1.699 |
| S10 | 4$^{th}$ Lens | 18.552466 | 0.45 | 1.6210 | 25.96 | 1.797 | 1.661 |
| S11 |  | 3.1175629 | 1.961057887 |  |  | 1.630 | 1.528 |
| S12 | 5$^{th}$ Lens | 5.4791262 | 0.46599221 | 1.5470 | 56.11 | 1.800 | 1.655 |
| S13 |  | 6.5273472 | 1.587853806 |  |  | 1.841 | 1.640 |
| S14 | Filter | Infinity | 0.11 |  |  | 2.1201943 | 1.667 |
| S15 |  | Infinity | 5.118637673 |  |  | 2.13416965 | 1.668 |
| S16 | Imaging Surface | Infinity |  |  |  | 3.13641114 | 1.759 |

In the optical imaging system 400, the total focal length f is 16 mm, Fno is 2.87, IMG HT is 3.136 mm, FOV is 20.6°, α is 72.479°, AL1 is 20.939 mm², BFL is 6.816 mm, TTL is 14.4 mm, and PTTL is 17.65 mm. An edge thickness of the fifth lens 450 is 0.4 mm, an SAG value SAG51 of the object-side surface of the fifth lens 450 is 0.24 mm, and an SAG value SAG52 of the image side of the fifth lens 450 is 0.16 mm.

A focal length of the first lens 410 is 5.01429 mm, a focal length of the second lens 420 is −4.52334 mm, a focal length of the third lens 430 is 6.55033 mm, and a focal length of the fourth lens 440 is −6.10629 mm, a focal length of the fifth lens 450 is 53.9555 mm.

The first lens 410 has positive refractive power, and first and second surfaces of the first lens 410 are convex.

The second lens 420 has negative refractive power, and first and second surfaces of the second lens 420 are concave.

The third lens 430 has positive refractive power, and first and second surfaces of the third lens 430 are convex.

The fourth lens 440 has negative refractive power, a first surface of the fourth lens 440 is convex, and a second surface of the fourth lens 440 is concave.

The fifth lens 450 has positive refractive power, a first surface of the fifth lens 450 is convex, and a second surface of the fifth lens 450 is concave.

Respective surfaces of the first lens 410 to the fifth lens 450 have an aspheric surface coefficient as illustrated in Table 8. For example, both the object-side surface and the image-side surface of the first lens 410 to the fifth lens 450 are aspheric surfaces.

TABLE 8

|  | K | A | B | C | D | E |
|---|---|---|---|---|---|---|
| S4 | −6.33E−01 | 9.59E−04 | 1.22E−04 | −1.00E−06 | 1.00E−06 | 5.32E−09 |
| S5 | 0 | 3.05E−03 | −2.00E−06 | 3.63E−07 | −2.00E−06 | 1.33E−07 |
| S6 | 0 | −5.64E−03 | 7.84E−04 | −5.90E−05 | 3.00E−06 | −2.41E−08 |

TABLE 8-continued

|  | K | A | B | C | D | E |
|---|---|---|---|---|---|---|
| S7 | 0 | −1.01E−02 | 6.02E−04 | −2.00E−04 | 5.50E−05 | −2.00E−06 |
| S8 | 0 | −7.36E−03 | 1.41E−03 | −2.06E−04 | −1.50E−05 | 1.00E−05 |
| S9 | 0 | −1.16E−02 | 2.46E−03 | −3.86E−04 | 5.00E−06 | 6.00E−06 |
| S10 | 0 | −1.17E−02 | 4.20E−05 | 7.72E−04 | −1.90E−04 | 1.10E−05 |
| S11 | 0 | −1.07E−02 | 1.04E−03 | 8.23E−04 | −5.60E−05 | −1.20E−05 |
| S12 | 0 | −1.98E−02 | 1.84E−03 | 5.42E−04 | 6.00E−06 | −6.00E−06 |
| S13 | 0 | −1.94E−02 | 1.69E−03 | 4.30E−04 | −4.40E−05 | 8.00E−06 |

Figure 8:
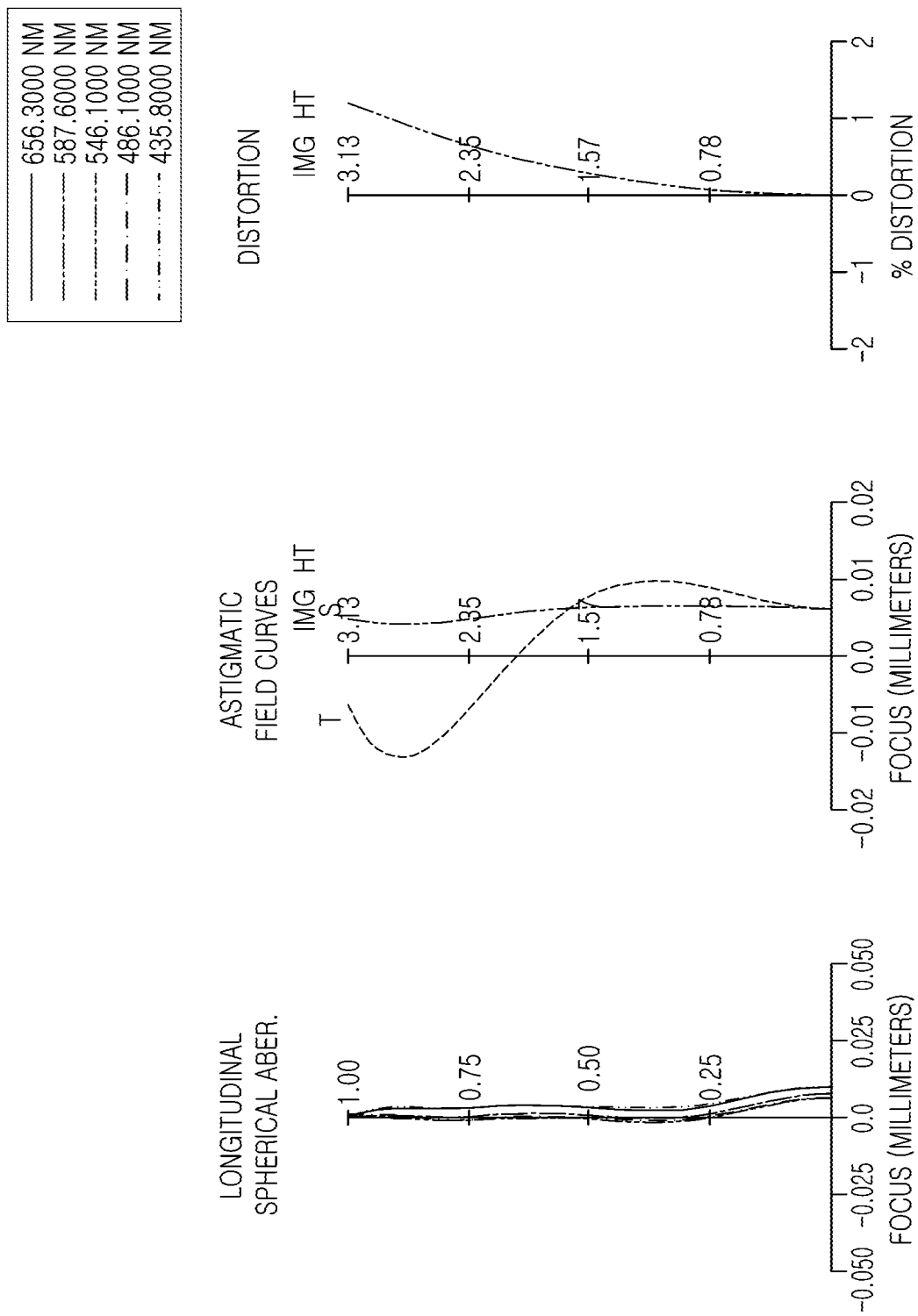
FIG. 8 is a curve illustrating aberration characteristics of the optical imaging system illustrated in FIG. 7.

In addition, the optical system configured as described above may have aberration characteristics as illustrated in FIG. 8.

Figure 9:
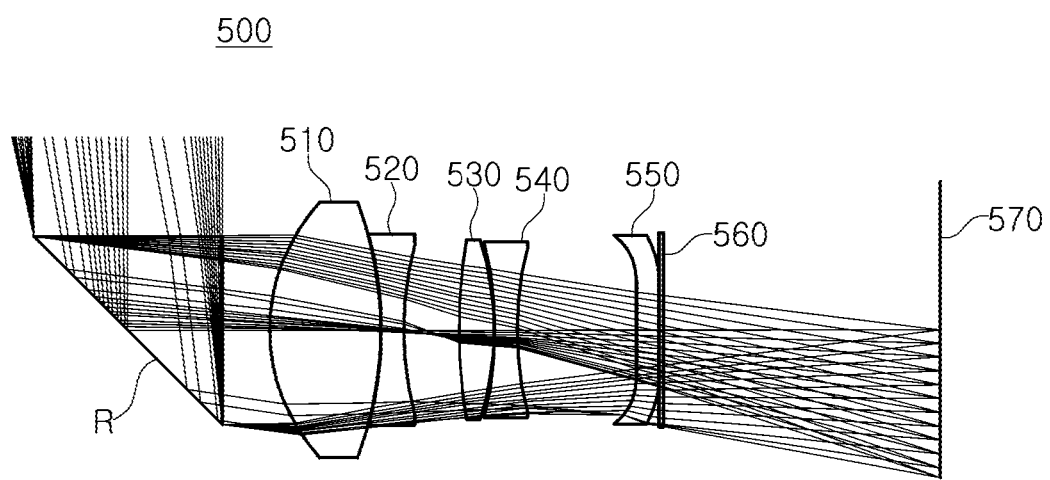
FIG. 9 is a configuration diagram of an optical imaging system according to a fifth example.

An optical imaging system according to a fifth example will be described with reference to FIGS. 9 and 10.

The optical imaging system 500 may include an optical system including a first lens 510, a second lens 520, a third lens 530, a fourth lens 540, and a fifth lens 550, and may further include a filter 560 and an image sensor 570.

A reflective member R disposed closer to an object side than the first lens 510 and having a reflective surface changing an optical path may be further included. The reflective member R may be a prism, but may also be provided as a mirror.

Light incident on the reflective member R may be bent by the reflective member R to pass through the first lens 510 to the fifth lens 550.

Lens characteristics of each lens (radius of curvature, a thickness of a lens or a distance between lenses, a refractive index, Abbe number, a focal length) are illustrated in the following Table 9.

object-side surface of the fifth lens 550 is −0.5 mm, and an SAG value SAG52 of the image-side surface of the fifth lens 550 is −0.25 mm.

A focal length of the first lens 510 is 4.78929 mm, a focal length of the second lens 520 is −5.21141 mm, a focal length of the third lens 530 is 6.20563 mm, a focal length of the fourth lens 540 is −5.82674 mm, and a focal length of the fifth lens 550 is −37.5441 mm.

The first lens 510 has positive refractive power, and first and second surfaces of the first lens 510 are convex.

The second lens 520 has negative refractive power, and first and second surfaces of the second lens 520 are concave.

The third lens 530 has positive refractive power, and first and second surfaces of the third lens 530 are convex.

The fourth lens 540 has negative refractive power, and first and second surfaces of the fourth lens 540 are concave.

The fifth lens 550 has negative refractive power, a first surface of the fifth lens 550 is convex, and a second surface of the fifth lens 550 is concave.

TABLE 9

| Surface No. | Remarks | Curvature Radius | Thickness or Distance | Refractive Index | Abbe No. | Maximum Effective Radius | Minimum Effective Radius |
|---|---|---|---|---|---|---|---|
| S1 | Prism | Infinity | 2.000 | 1.5167 | 64.17 | 2.3 | — |
| S2 |  | Infinity | 2.000 | 1.5167 | 64.17 | 3.300 | — |
| S3 |  | Infinity | 1.000 |  |  | 2.3 | — |
| S4 | 1st Lens | 4.0028904 | 2.311301577 | 1.5370 | 55.65 | 2.720 | 2.383 |
| S5 |  | −5.731393 | 0.03 |  |  | 2.687 | 2.169 |
| S6 | 2nd Lens | −8.423958 | 0.45 | 1.6210 | 25.96 | 2.638 | 2.138 |
| S7 |  | 5.3571097 | 1.193897185 |  |  | 2.271 | 1.993 |
| S8 | 3rd Lens | 6.8122096 | 0.730352045 | 1.6790 | 19.24 | 1.967 | 1.880 |
| S9 |  | −10.56266 | 0.03 |  |  | 1.945 | 1.870 |
| S10 | 4th Lens | −12.19519 | 0.45 | 1.6210 | 25.96 | 1.908 | 1.833 |
| S11 |  | 5.2128762 | 2.537843027 |  |  | 1.818 | 1.714 |
| S12 | 5th Lens | 16.062368 | 0.45 | 1.5470 | 56.11 | 1.800 | 1.566 |
| S13 |  | 8.9201916 | 0.108878948 |  |  | 2.054 | 1.637 |
| S14 | Filter | Infinity | 0.11 |  |  | 2.12637643 | 1.642 |
| S15 |  | Infinity | 5.797727292 |  |  | 2.13873082 | 1.643 |
| S16 | Imaging Surface | Infinity |  |  |  | 3.13726475 | 1.760 |

In the optical imaging system 500, the total focal length f is 16.2 mm, Fno is 2.98, IMG HT is 3.137 mm, FOV is 20.3°, α is 57.667°, AL1 is 22.048 mm², BFL is 6.017 mm, TTL is 14.2 mm, and PTTL is 17.2 mm. An edge thickness of the fifth lens 550 is 0.52 mm, an SAG value SAG51 of the Respective surfaces of the first lens 510 to the fifth lens 550 have an aspheric surface coefficient as illustrated in Table 10. For example, both the object-side surface and the image-side surface of the first lens 510 to the fifth lens 550 are aspheric surfaces.

TABLE 10

|  | K | A | B | C | D | E |
|---|---|---|---|---|---|---|
| S4 | −7.02E−01 | 7.54E−04 | 9.10E−05 | −1.52E−07 | 1.00E−06 | 9.92E−09 |
| S5 | 0 | 3.25E−03 | 1.08E−04 | 5.00E−06 | −2.00E−06 | 1.34E−07 |
| S6 | 0 | −4.56E−03 | 8.50E−04 | −5.70E−05 | 3.00E−06 | −1.02E−07 |

TABLE 10-continued

|     | K | A | B | C | D | E |
|-----|---|---|---|---|---|---|
| S7  | 0 | −8.87E−03 | 5.02E−04 | −1.38E−04 | 3.10E−05 | −1.00E−06 |
| S8  | 0 | −8.73E−03 | 9.33E−04 | −3.23E−04 | −4.80E−05 | 7.00E−06 |
| S9  | 0 | −1.13E−02 | 1.93E−03 | −4.00E−04 | 1.60E−05 | 3.81E−08 |
| S10 | 0 | −1.14E−02 | 2.52E−04 | 8.12E−05 | −1.78E−04 | 1.50E−05 |
| S11 | 0 | −1.08E−02 | 3.29E−04 | 7.71E−04 | −2.20E−04 | 2.10E−05 |
| S12 | 0 | −4.46E−02 | 1.10E−03 | 4.91E−04 | −1.38E−04 | 4.49E−07 |
| S13 | 0 | −4.17E−02 | 3.28E−03 | 1.25E−04 | −1.04E−04 | 8.00E−06 |

Figure 10:
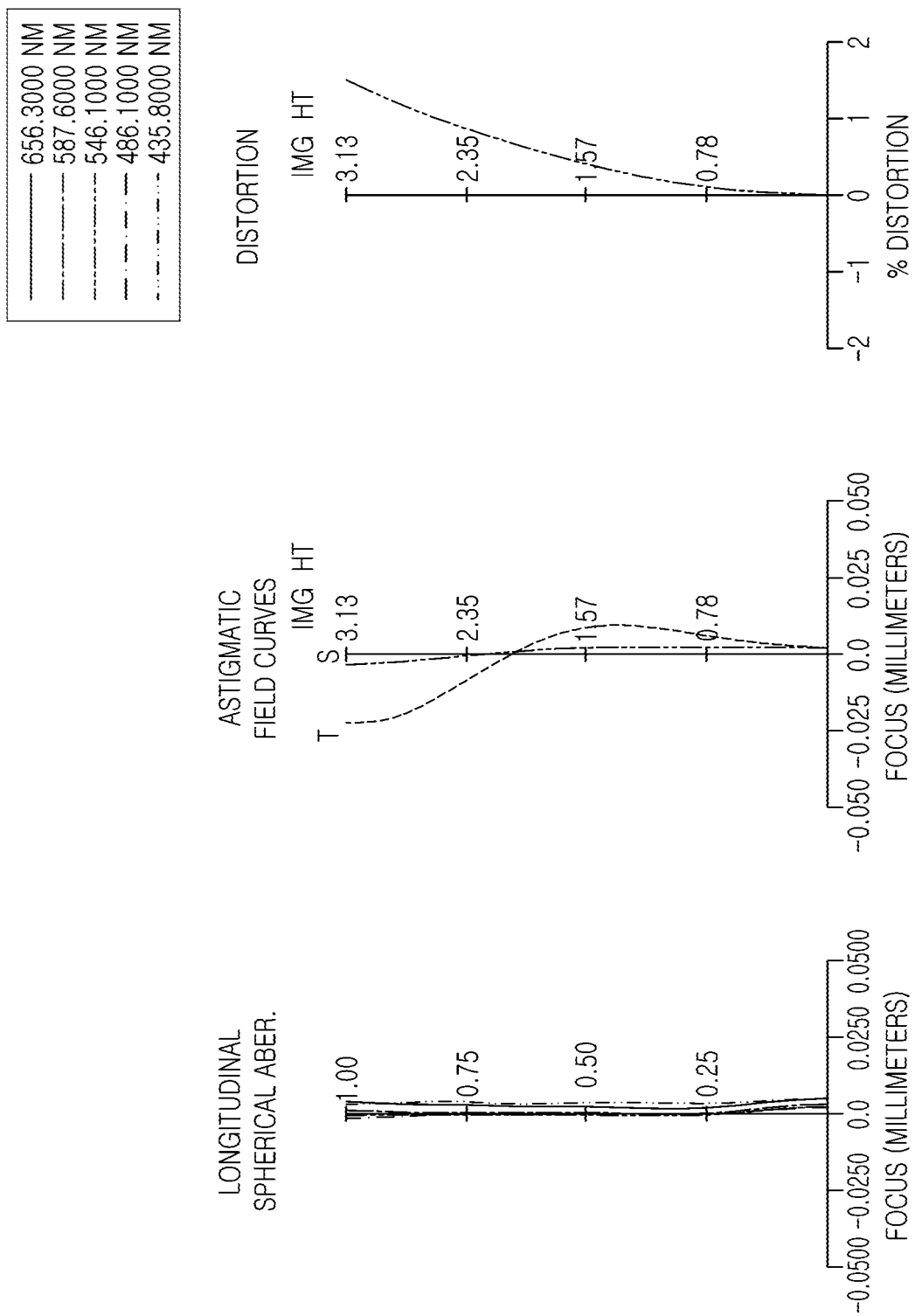
FIG. 10 is a curve illustrating aberration characteristics of the optical imaging system illustrated in FIG. 9.

In addition, the optical system configured as described above may have aberration characteristics as illustrated in FIG. 10.

Figure 11:
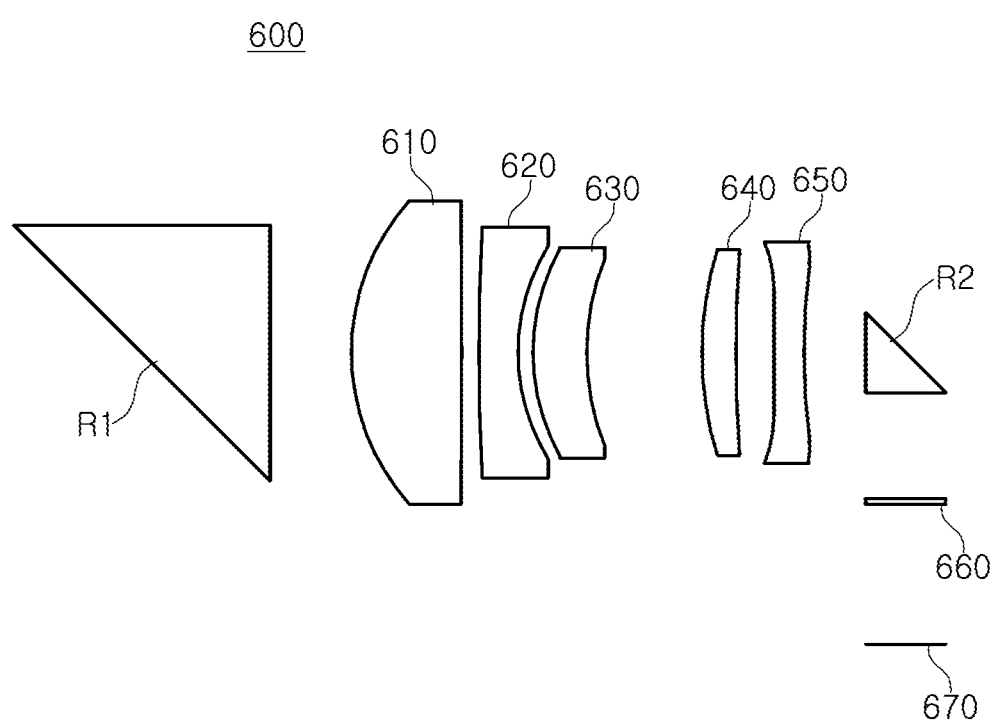
FIG. 11 is a configuration diagram of an optical imaging system according to a sixth example.

An optical imaging system according to a sixth example will be described with reference to FIGS. 11 and 12.

The optical imaging system 600 may include an optical system including a first lens 610, a second lens 620, a third lens 630, a fourth lens 640, and a fifth lens 650, and may further include a filter 660 and an image sensor 670.

A first reflective member R1 disposed closer to an object side than first lens 610 and having a reflective surface changing an optical path may be further included. A second reflective member R2 disposed between the fifth lens 650 and the filter 660 and having a reflective surface changing an optical path may be further included. In the sixth embodiment of the present disclosure, the first reflective member R1 and the second reflective member R2 may be prisms, but may also be provided as mirrors.

Light incident on the first reflective member R1 may be bent by the first reflective member R1 to pass through the first lens 610 to the fifth lens 650.

Light passing through the first lens 610 to the fifth lens 650 may be bent by the second reflective member R2 and may be received by the image sensor 670.

Lens characteristics of each lens (radius of curvature, a thickness of a lens or a distance between lenses, a refractive index, Abbe number, a focal length) are illustrated in the following Table 11.

In the optical imaging system 600, the total focal length f is 15.5 mm, Fno is 2.87, IMG HT is 3.135 mm, FOV is 22.9°, α is 91.957°, AL1 is 18.763 mm², BFL is 8.511 mm, TTL is 16.71 mm, and PTTL is 20.28 mm. An edge thickness of the fifth lens 650 is 0.76 mm, an SAG value SAG51 of the object-side surface of the fifth lens 650 is −0.16 mm, and an SAG value SAG52 of the image-side surface of the fifth lens 650 is 0.09 mm.

A focal length of the first lens 610 is 7.03226 mm, a focal length of the second lens 620 is −5.73353 mm, a focal length of the third lens 630 is 29.0425 mm, a focal length of the fourth lens 640 is 13.9773 mm, and a focal length of the fifth lens 650 is −21.2029 mm.

The first lens 610 has positive refractive power, and first and second surfaces of the first lens 610 are convex.

The second lens 620 has negative refractive power, a first surface of the second lens 620 is convex, and a second surface of the second lens 620 is concave.

The third lens 630 has positive refractive power, a first surface of the third lens 630 is convex, and a second surface of the third lens 630 is concave.

The fourth lens 640 has positive refractive power, a first surface of the fourth lens 640 is convex, and a second surface of the fourth lens 640 is concave.

The fifth lens 650 has negative refractive power, a first surface of the fifth lens 650 is convex, and a second surface of the fifth lens 650 is concave.

TABLE 11

| Surface No. | Remarks | Curvature Radius | Thickness or Distance | Refractive Index | Abbe No. | Maximum Effective Radius | Minimum Effective Radius |
|---|---|---|---|---|---|---|---|
| S1  | 1st Prism | Infinity | 2.250 | 1.5167 | 64.17 | 2.3 | — |
| S2  |           | Infinity | 2.250 | 1.5167 | 64.17 | 3.300 | — |
| S3  |           | Infinity | 1.320 |        |       | 2.3 | — |
| S4  | 1st Lens  | 4.1411881 | 2 | 1.5370 | 55.66 | 2.720 | 1.890 |
| S5  |           | −35.33227 | 0.34436658 |  |  | 2.483 | 1.722 |
| S6  | 2nd Lens  | 21.115782 | 0.678878531 | 1.6210 | 25.96 | 2.246 | 1.692 |
| S7  |           | 3.0076075 | 0.272168709 |  |  | 1.923 | 1.548 |
| S8  | 3rd Lens  | 3.4633341 | 0.96246733 | 1.5710 | 37.36 | 1.904 | 1.620 |
| S9  |           | 3.9349415 | 2.107129375 |  |  | 1.713 | 1.530 |
| S10 | 4th Lens  | 5.322539 | 0.597758202 | 1.6210 | 25.96 | 1.850 | 1.698 |
| S11 |           | 13.182253 | 0.666583076 |  |  | 1.853 | 1.633 |
| S12 | 5th Lens  | 20.452439 | 0.569126583 | 1.5460 | 56.10 | 1.800 | 1.662 |
| S13 |           | 7.323996 | 1.657499029 |  |  | 1.996 | 1.663 |
| S14 | 2nd Prism | Infinity | 0.7 | 1.5167 | 64.17 | 2 | — |
| S15 |           | Infinity | 0.7 | 1.5167 | 64.17 | 2 | — |
| S16 |           | Infinity | 1 |  |  | 2 | — |
| S17 | Filter    | Infinity | 0.11 |  |  |  | — |
| S18 |           | Infinity | 4.343955975 |  |  |  | — |
| S19 | Imaging Surface | Infinity |  |  |  | 3.13530848 | 1.761 |

Respective surfaces of the first lens 610 to the fifth lens 650 have an aspheric surface coefficient as illustrated in Table 12. For example, both the object-side surface and the image-side surface of the first lens 610 to the fifth lens 650 are aspheric surfaces.

TABLE 12

|  | K | A | B | C | D | E |
|---|---|---|---|---|---|---|
| S4 | −5.99E−01 | 1.17E−03 | 9.20E−05 | −3.00E−06 | 1.00E−06 | −5.77E−08 |
| S5 | 0 | 2.51E−03 | 3.00E−06 | 1.00E−06 | −2.00E−06 | 9.57E−08 |
| S6 | 0 | −5.55E−03 | 7.62E−04 | −5.90E−05 | 3.00E−06 | −1.67E−07 |
| S7 | 0 | −1.12E−02 | 7.99E−04 | −2.20E−04 | 4.10E−05 | −3.00E−06 |
| S8 | 0 | −8.23E−03 | 1.36E−03 | −2.00E−04 | −1.30E−05 | 4.00E−06 |
| S9 | 0 | −1.22E−02 | 2.93E−03 | −3.07E−04 | −2.80E−05 | 9.00E−06 |
| S10 | 0 | −1.16E−02 | 2.92E−04 | 6.93E−04 | −1.42E−04 | 1.20E−05 |
| S11 | 0 | −1.27E−02 | 8.68E−04 | 8.21E−04 | −1.94E−04 | 1.20E−05 |
| S12 | 0 | −1.82E−02 | 1.30E−03 | 3.19E−04 | −1.19E−04 | −2.00E−06 |
| S13 | 0 | −1.39E−02 | 7.26E−04 | 2.36E−04 | −1.16E−04 | 1.00E−05 |

Figure 12:
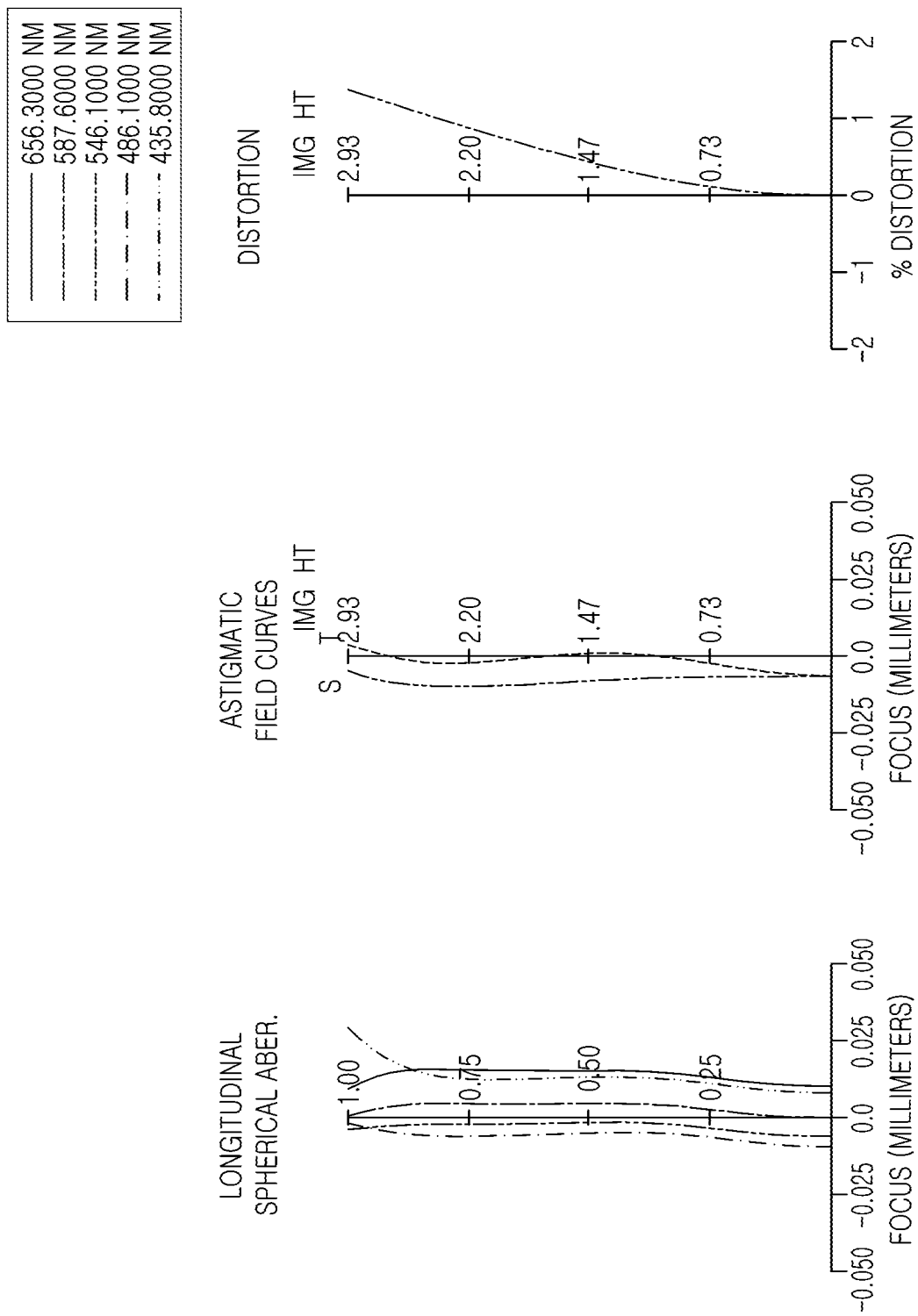
FIG. 12 is a curve illustrating aberration characteristics of the optical imaging system illustrated in FIG. 11.

In addition, the optical system configured as described above may have aberration characteristics as illustrated in FIG. 12.

Figure 13:
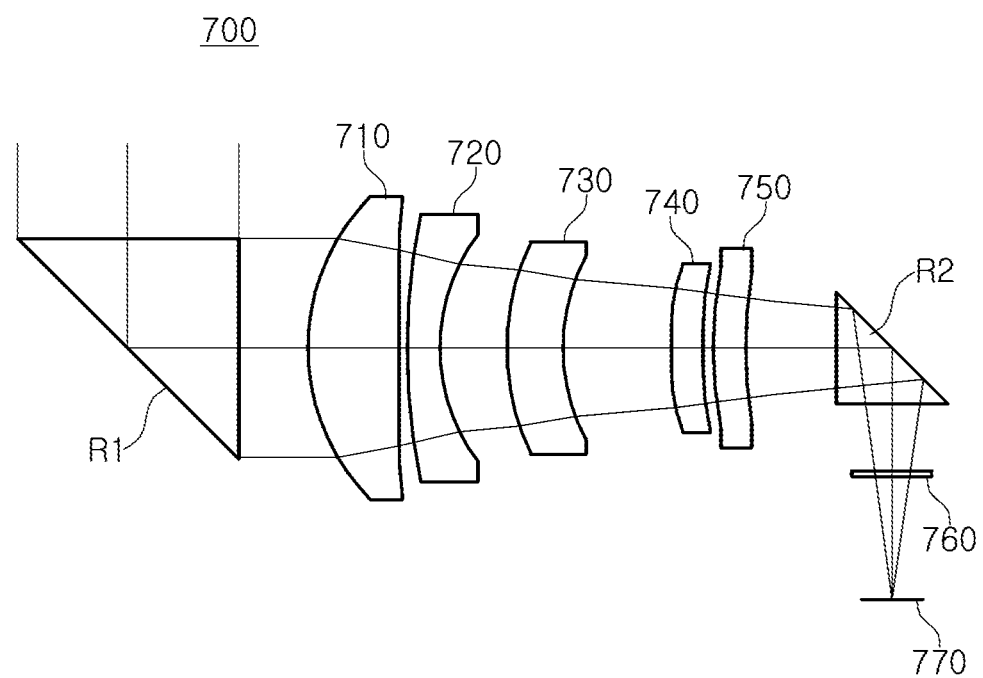
FIG. 13 is a configuration diagram of an optical imaging system according to a seventh example.

An optical imaging system according to a seventh example will be described with reference to FIGS. 13 and 14.

The optical imaging system 700 may include an optical system including a first lens 710, a second lens 720, a third lens 730, a fourth lens 740, and a fifth lens 750, and may further include a filter 760 and an image sensor 770.

A first reflective member R1 disposed closer to an object side than the first lens 710 and having a reflective surface changing an optical path may be further included. A second reflective member R2 disposed between the fifth lens 750 and the filter 760 and having a reflective surface changing an optical path may be further included. The first reflective member R1 and the second reflective member R2 may be prisms, but may also be provided as mirrors.

Light incident on the first reflective member R1 may be bent by the first reflective member R1 to pass through the first lens 710 to the fifth lens 750.

Light passing through the first lens 710 to the fifth lens 750 may be bent by the second reflective member R2 and may be received by the image sensor 770.

Lens characteristics of each lens (radius of curvature, a thickness of a lens or a distance between lenses, a refractive index, Abbe number, a focal length) are illustrated in the following Table 13.

TABLE 13

| Surface No. | Remarks | Curvature Radius | Thickness or Distance | Refractive Index | Abbe No. | Maximum Effective Radius | Minimum Effective Radius |
|---|---|---|---|---|---|---|---|
| S1 | 1st Prism | Infinity | 2.250 | 1.5167 | 64.17 | 2.3 | — |
| S2 |  | Infinity | 2.250 | 1.5167 | 64.17 | 3.300 | — |
| S3 |  | Infinity | 1.320 |  |  | 2.3 | — |
| S4 | 1st Lens | 3.9169565 | 1.613027009 | 1.5370 | 55.66 | 2.720 | 1.937 |
| S5 |  | −66.82201 | 0.156209798 |  |  | 2.568 | 1.806 |
| S6 | 2nd Lens | 8.5963539 | 0.601622164 | 1.6210 | 25.96 | 2.371 | 1.756 |
| S7 |  | 2.9578867 | 1.185731986 |  |  | 1.974 | 1.619 |
| S8 | 3rd Lens | 3.9916928 | 1 | 1.5710 | 37.36 | 1.780 | 1.675 |
| S9 |  | 3.3199729 | 1.921811782 |  |  | 1.565 | 1.565 |
| S10 | 4th Lens | 4.3379915 | 0.547808566 | 1.6210 | 25.96 | 1.866 | 1.687 |
| S11 |  | 5.5652265 | 0.2 |  |  | 1.872 | 1.653 |
| S12 | 5th Lens | 5.4137437 | 0.571570221 | 1.5460 | 56.10 | 1.800 | 1.653 |
| S13 |  | 5.8045758 | 1.657499028 |  |  | 1.986 | 1.656 |
| S14 | 2nd Prism | Infinity | 0.7 | 1.5167 | 64.17 | 0.700 | — |
| S15 |  | Infinity | 0.7 | 1.5167 | 64.17 | 0.700 | — |
| S16 |  | Infinity | 0.7 |  |  | 0.7 | — |
| S17 | Filter | Infinity | 0.11 |  |  |  |  |
| S18 |  | Infinity | 4.671196949 |  |  | 2.28106867 | 1.68260227 |
| S19 | Imaging Surface | Infinity |  |  |  | 3.13702172 | 1.76020658 |

In the optical imaging system 700, the total focal length f is 14.5 mm, Fno is 2.87, IMG HT is 3.137 mm, FOV is 22.9°, α is 89.204°, AL1 is 19.122 mm$^2$, BFL is 8.539 mm, TTL is 16.336 mm, and PTTL is 19.906 mm. An edge thickness of the fifth lens 750 is 0.57 mm, an SAG value SAG51 of the object-side surface of the fifth lens 750 is 0.07 mm, and an SAG value SAG52 of the image-side surface of the fifth lens 750 is 0.11 mm.

A focal length of the first lens 710 is 6.95076 mm, a focal length of the second lens 720 is −7.57602 mm, a focal length of the third lens 730 is −75.2843 mm, and a focal length of the fourth lens 740 is 27.0706 mm, a focal length of the fifth lens 750 is 96.9979 mm.

The first lens 710 has positive refractive power, and first and second surfaces of the first lens 710 are convex.

The second lens 720 has negative refractive power, a first surface of the second lens 720 is convex, and a second surface of the second lens 720 is concave.

The third lens 730 has negative refractive power, a first surface of the third lens 730 is convex, and a second surface of the third lens 730 is concave.

The fourth lens 740 has positive refractive power, a first surface of the fourth lens 740 is convex, and a second surface of the fourth lens 740 is concave.

The fifth lens 750 has positive refractive power, a first surface of the fifth lens 750 is convex, and a second surface of the fifth lens 750 is concave.

Respective surfaces of the first lens 710 to the fifth lens 750 have an aspheric surface coefficient as illustrated in Table 14. For example, both the object-side surface and the image-side surface of the first lens 710 to the fifth lens 750 are aspheric surfaces.

TABLE 14

|     | K         | A         | B         | C         | D         | E         |
|-----|-----------|-----------|-----------|-----------|-----------|-----------|
| S4  | −6.50E−01 | 9.79E−04  | 1.01E−04  | −3.00E−06 | 1.00E−06  | −6.65E−08 |
| S5  | 0         | 2.27E−03  | 4.00E−06  | 6.00E−06  | −2.00E−06 | 9.49E−08  |
| S6  | 0         | −5.83E−03 | 7.55E−04  | −6.30E−05 | 4.00E−06  | −2.49E−08 |
| S7  | 0         | −1.07E−02 | 7.91E−04  | −2.01E−04 | 3.40E−05  | −3.00E−06 |
| S8  | 0         | −7.12E−03 | 1.38E−03  | −1.99E−04 | 2.40E−05  | −3.00E−06 |
| S9  | 0         | −1.54E−02 | 2.85E−03  | −9.30E−05 | −7.50E−05 | 1.20E−05  |
| S10 | 0         | −1.25E−02 | 6.49E−04  | 4.51E−04  | −1.28E−04 | 1.60E−05  |
| S11 | 0         | −1.25E−02 | 1.09E−03  | 7.66E−04  | −2.89E−04 | 2.60E−05  |
| S12 | 0         | −1.50E−02 | −7.00E−05 | 2.12E−04  | −1.20E−04 | −2.00E−05 |
| S13 | 0         | −1.20E−02 | −9.85E−04 | 1.96E−04  | −7.00E−05 | 7.00E−06  |

Figure 14:
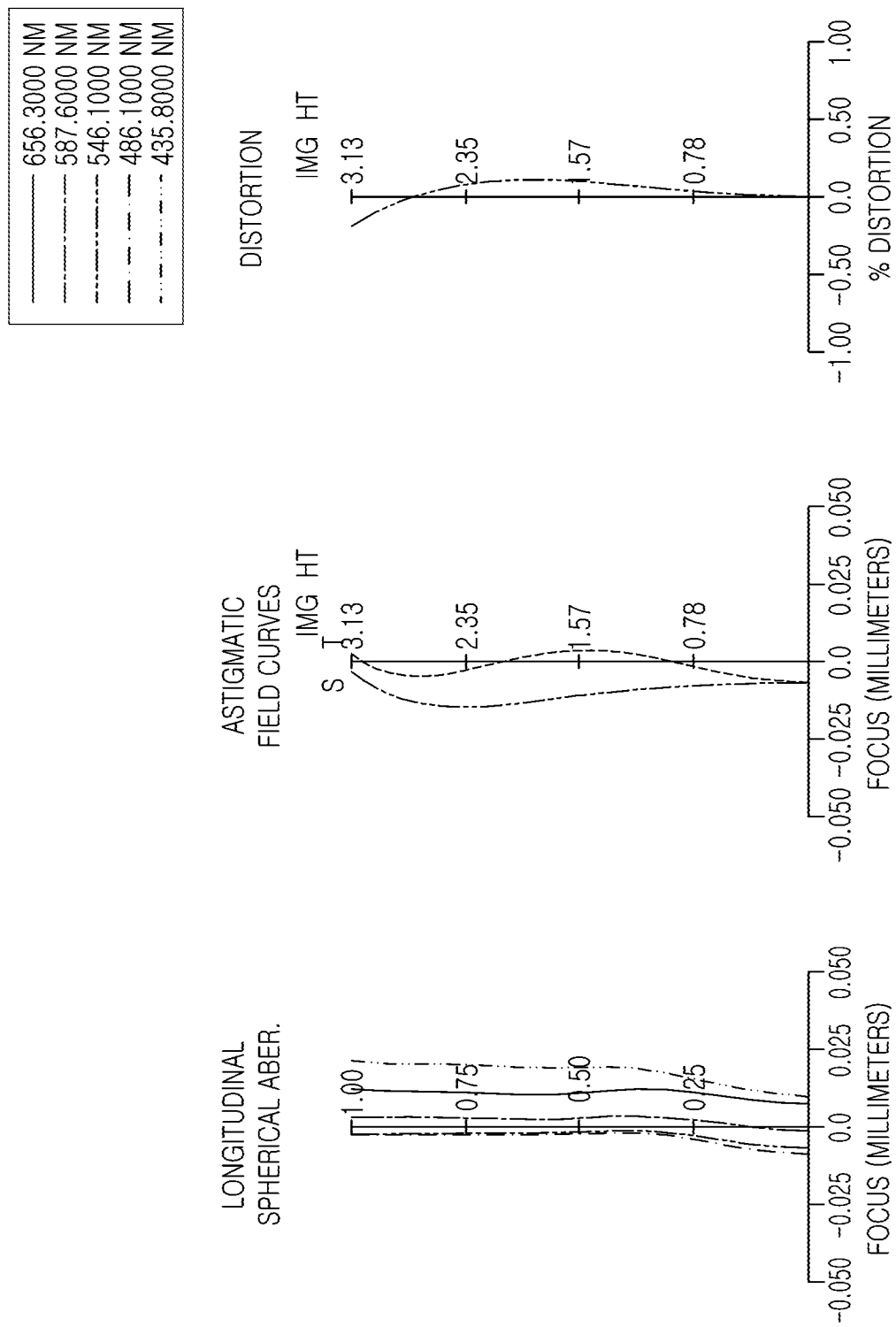
FIG. 14 is a curve illustrating aberration characteristics of the optical imaging system illustrated in FIG. 13.

In addition, the optical system configured as described above may have aberration characteristics as illustrated in FIG. 14.

FIG. 15 is a schematic perspective view of an optical imaging system according to an example.

Referring to FIG. 15, an optical imaging system may include a plurality of lenses L1, L2, L3, L4, and L5, and a spacer S1.

Although not illustrated in the drawings, the optical imaging system may further include a reflective member disposed closer to an object side than the plurality of lenses. In addition, a filter and an image sensor may be further included.

For example, the optical imaging system may be any one of the optical imaging systems according to the first to seventh examples described above.

The plurality of lenses L1, L2, L3, L4, and L5 may be arranged to be spaced apart from adjacent lenses.

At least some of the lenses L1, L2, L3, L4, and L5 may have a non-circular planar shape. For example, the first lens L1 and the second lens L2 may be formed to have a non-circular shape, and the third lens L3 to the fifth lens L5 may be formed to have a circular shape. Alternatively, all of the plurality of lenses may be formed to have a non-circular shape.

Figure 18:
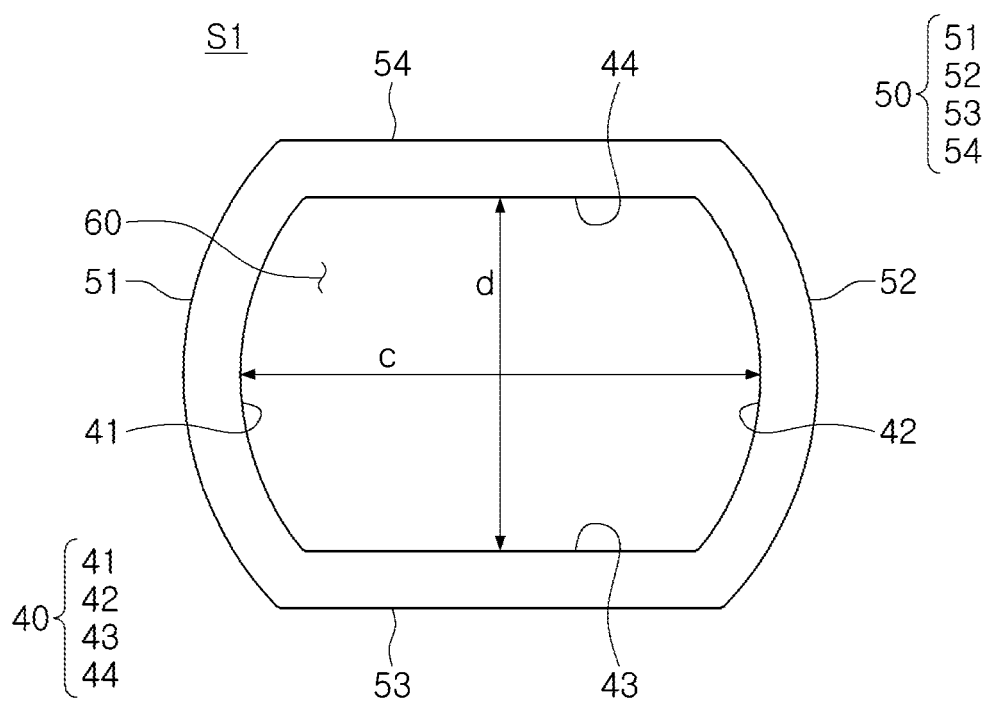
FIG. 18 is a plan view of a first spacer of an optical imaging system according to an example.

FIG. 18 is a plan view of a first spacer of an optical imaging system according to an example.

Referring to FIG. 18, a spacer may be provided between lenses adjacent to each other.

The spacer may maintain a distance between the lenses, and may block unnecessary light. For example, the spacer may be provided with a light absorbing layer to block the unnecessary light. The light absorbing layer may be a black film or black iron oxide.

The spacer may include a first spacer S1, a second spacer, a third spacer, and a fourth spacer, arranged from an object side toward an image side.

The first spacer S1 may be disposed between lenses having a non-circular shape. For example, the first spacer S1 may be disposed between a first lens L1 and a second lens L2.

The second spacer may be disposed between the second lens L2 and a third lens L3, the third spacer may be disposed between the third lens L3 and a fourth lens L4, and the fourth spacer may be disposed between the fourth lens L4 and a fifth lens L5. For reference, only the first spacer S1 is illustrated in FIGS. 15 and 18.

The first spacer S1 may have an opening 60 through which light passes. The opening 60 may be formed by an inner peripheral surface 40 of the first spacer S1. For example, a space surrounded by the inner peripheral surface 40 of the first spacer S1 may serve as the opening 60.

An external peripheral surface 50 of the first spacer S1 may be non-circular, when viewed in the optical axis direction, and the inner peripheral surface 40 of the first spacer S1 may be also non-circular, when viewed in the optical axis direction.

The external peripheral surface 50 of the first spacer S1 may correspond to shapes of the first lens L1 and the second lens L2. For example, the external peripheral surface 50 of the first spacer S1 may include a first external surface 51, a second external surface 52, a third external surface 53, and a fourth external surface 54.

The first external surface 51 and the second external surface 52 may have opposite shapes facing each other, and the third external surface 53 and the fourth external surface 54 may have opposite shapes facing each other.

When viewed in the optical axis direction, the first external surface 51 and the second external surface 52 may have an arc shape, and the third external surface 53 and the fourth external surface 54 may have a substantially linear shape.

The third external surface 53 and the fourth external surface 54 may connect the first external surface 51 and the second external surface 52, respectively.

In addition, the third external surface 53 and the fourth external surface 54 may be symmetrical about the optical axis and may be formed parallel to each other.

The inner peripheral surface 40 of the first spacer S1 may include a first internal surface 41, a second internal surface 42, a third internal surface 43, and a fourth internal surface 44.

The first internal surface 41 and the second internal surface 42 may face each other and may have a corresponding shape, and the third internal surface 43 and the fourth internal surface 44 may face each other and may have a corresponding shape.

When viewed in the optical axis direction, the first internal surface 41 and the second internal surface 42 may have an arc shape, and the third internal surface 43 and the fourth internal surface 44 may have a substantially linear shape.

The third internal surface 43 and the fourth internal surface 44 may connect the first internal surface 41 and the second internal surface 42, respectively.

In addition, the third internal surface 43 and the fourth internal surface 44 may be symmetrical about the optical axis, and may be formed parallel to each other.

The inner peripheral surface 50 of the first spacer S1 may have a major axis (c) and a minor axis (d). For example, when viewed in the optical axis direction, a line segment connecting the third internal surface 43 and the fourth internal surface 44 at the shortest distance while passing through the optical axis may be the minor axis (d), and a line segment connecting the first internal surface 41 and the second internal surface 42 while passing through the optical axis and perpendicular to the minor axis (d) may be the major axis (c).

In this case, half of the major axis (c) may be the maximum radius of the opening 60, and half of the minor axis (d) may be the minimum radius of the opening 60.

FIGS. 19 to 22 are rear views of a portable electronic device equipped with a camera module.

The portable electronic device 1 illustrated in FIGS. 19 to 22 may be a portable electronic device such as a mobile communication terminal equipped with a plurality of camera modules, a smartphone, or a tablet PC.

Each of the plurality of camera modules may include an optical imaging system.

In FIGS. 19 to 22, a camera module 2 may include any one of the optical imaging systems according to the first to seventh examples described above.

The camera module 2 may bend a traveling direction of light through a reflective member.

An optical axis of the camera module 2 may face a direction, perpendicular to a thickness direction of the portable electronic device 1 (a Z-axis direction, a direction toward a rear surface of the portable electronic device from a front surface thereof, or vice versa).

For example, the optical axis of the camera module 2 may be formed in a width direction (a Y direction) or a length direction (an X direction) of the portable electronic device 1.

Therefore, even when the camera module 2 has characteristics of a telephoto camera having a relatively long focal length, an increase in thickness of the portable electronic device 1 may be prevented. Therefore, the thickness of the portable electronic device 1 may be minimized.

Figure 19:
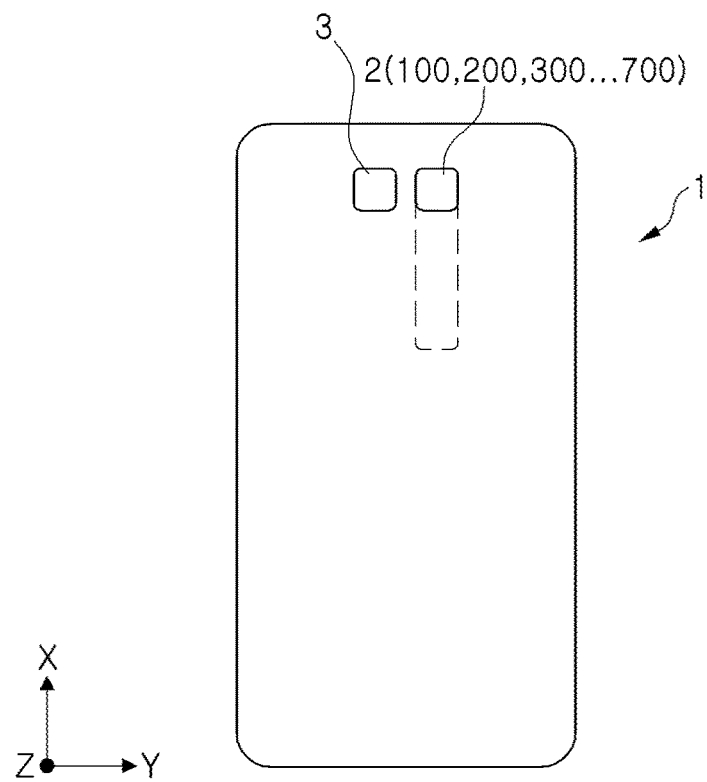
FIGS. 19, 20, 21, and 22 are rear views of a portable electronic device equipped with a camera module.

Referring to FIG. 19, a first camera module 2 and a second camera module 3 may be provided in the portable electronic device 1. For example, the portable electronic device 1 may include a dual camera module.

Optical axes of the first camera module 2 and the second camera module 3 may be formed in different directions. For example, an optical axis of the first camera module 2 may be formed in the X direction, and an optical axis of the second camera module 3 may be formed in the Z direction.

In addition, the first camera module 2 and the second camera module 3 may be configured to have different angles of view and focal lengths.

The first camera module 2 may be configured to have a relatively narrow angle of view and a relatively long focal length (e.g., a telephoto), and the second camera module 3 may be configured to have a relatively wide angle of view and a relatively short focal length (e.g., a wide angle).

As an example, an angle of view of the first camera module 2 may be formed smaller than 30°. For example, an angle of view of the first camera module 2 may be formed to have a range of 10° to 30°. An angle of view of the second camera module 3 may be formed to have a range of 75° to 85°.

The first camera module 2 may be formed to have a range in which Fno satisfies 2.8 Fno<5. The second camera module 3 may be formed to have a range in which Fno satisfies 1.4≤Fno≤2.4.

The angles of view and focal lengths of the two camera modules may be designed differently to capture an image of a subject at various depths.

Figure 20:
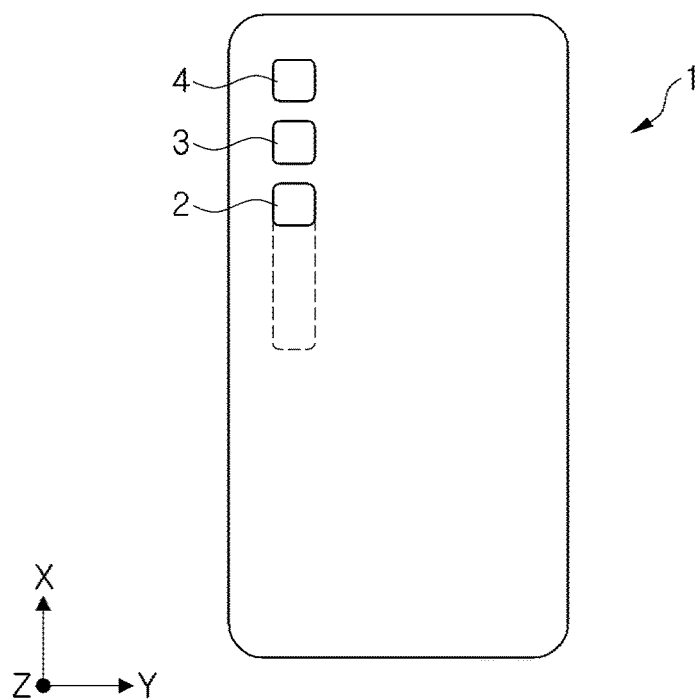

Referring to FIG. 20, a first camera module 2, a second camera module 3, and a third camera module 4 may be provided in the portable electronic device 1. For example, the portable electronic device 1 may include a triple camera module. The first camera module 2 to the third camera module 4 may be arranged in the width direction (the Y direction) or the length direction (the X direction) of the portable electronic device 1.

An optical axis of the first camera module 2 may be formed in a different direction from an optical axis of the second camera module 3 and an optical axis of the third camera module 4. For example, an optical axis of the first camera module 2 may be formed in the X direction, and an optical axis of the second camera module 3 and an optical axis of the third camera module 4 may be formed in the Z direction.

Also, the first camera module 2 to the third camera module 4 may be configured to have different angles of view and focal lengths.

The first camera module 2 may be configured to have the narrowest angle of view and the longest focal length (e.g., a telephoto), and the third camera module 4 may be configured to have the widest angle of view and the shortest focal length (e.g., an ultra wide angle). The second camera module 3 may have a wider angle of view than the first camera module 2 and a narrower angle of view than the third camera module 4 (e.g., a wide angle).

As an example, an angle of view of the first camera module 2 may be formed smaller than 30°. For example, an angle of view of the first camera module 2 may be formed to have a range of 10° to 30°. An angle of view of the second camera module 3 may be formed to have a range of 75° to 85°. An angle of view of the third camera module 4 may be formed to have a range of 110° to 150°.

The first camera module 2 may be formed to have a range in which Fno satisfies 2.8≤Fno<5. The second camera module 3 may be formed to have a range in which Fno satisfies 1.4≤Fno≤2.4. The third camera module 4 may be formed to have a range in which Fno satisfies 2.0≤Fno≤2.4.

The angles of view and focal lengths of the three camera modules may be designed differently to capture an image of a subject at various depths.

Figure 21:
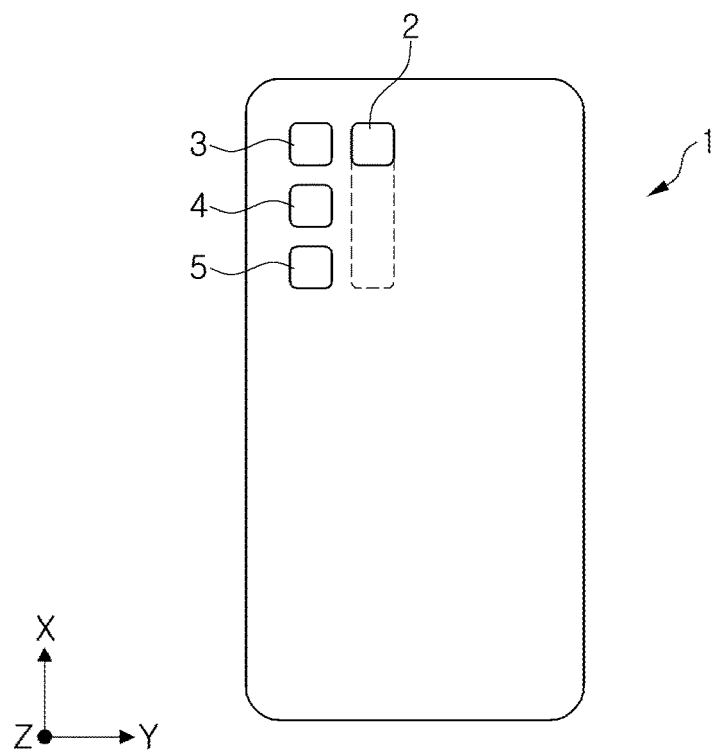

Referring to FIG. 21, a first camera module 2, a second camera module 3, a third camera module 4, and a fourth camera module 5 may be provided in the portable electronic device 1. For example, the portable electronic device 1 may include a quad camera module. The second camera module 3 to the fourth camera module 5 may be arranged in the width direction (the Y direction) or the length direction (the X direction) of the portable electronic device 1, and the first camera module 2 may be disposed next to the second camera module 3 to the fourth camera module 5. Therefore, the first to fourth camera modules 2, 3, 4, and 5 may be arranged in a quadrangular shape as a whole.

An optical axis of the first camera module 2 may be formed in a different direction from optical axes of the second camera module 3 to the fourth camera module 5. For example, the optical axis of the first camera module 2 may be formed in the X direction, and the optical axes of the second camera module 3 to the fourth camera module 5 may be formed in the Z direction.

Also, the first camera module 2 to the fourth camera module 5 may be configured to have different angles of view and focal lengths.

The first camera module 2 may be configured to have the narrowest angle of view and the longest focal length (e.g., a super telephoto), and the fourth camera module 5 may be configured to have the widest angle of view and the shortest focal length (e.g., an ultra wide angle). The second camera module 3 may have a wider angle of view than the first camera module 2 and a narrower angle of view than the third camera module 4 (e.g., a telephoto). The third camera module 4 may have a wider angle of view than the second camera module 3 and a narrower angle of view than the fourth camera module 5 (for example, a wide angle).

As an example, an angle of view of the first camera module 2 may be formed smaller than 30°. For example, an angle of view of the first camera module 2 may be formed to have a range of 10° to 30°. An angle of view of the second camera module 3 may be formed to have a range of 40° to 45°. An angle of view of the third camera module 4 may be formed to have a range of 75° to 85°. An angle of view of the fourth camera module 5 may be formed to have a range of 110° to 150°.

The first camera module 2 may be formed to have a range in which Fno satisfies 2.8≤Fno<5. The second camera module 3 may be formed to have a range in which Fno satisfies 1.8≤Fno≤2.4. The third camera module 4 may be formed to have a range in which Fno satisfies 1.4≤Fno≤2.4. The fourth camera module 5 may be formed to have a range in which Fno satisfies 2.0≤Fno≤2.4.

The angles of view and focal lengths of the four camera modules may be designed differently to capture an image of a subject at various depths.

Figure 22:
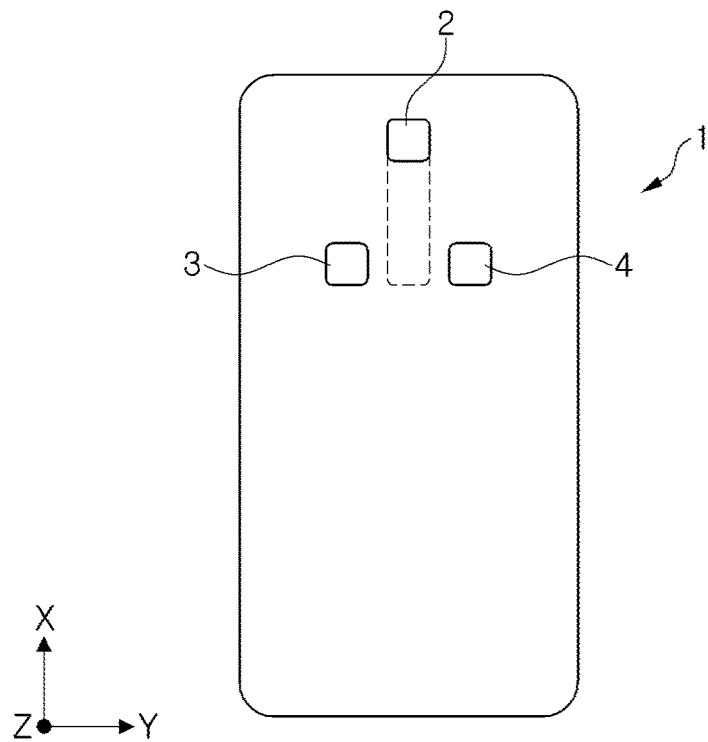

The example illustrated in FIG. 22 may be the same as the example illustrated in FIG. 20, but may be different therefrom, in view of an arrangement form of first to third camera modules 2, 3, and 4.

Referring to FIG. 22, the second camera module 3 and the third camera module 5 may be arranged on both sides of the first camera module 2. The second camera module 3 and the third camera module 5 may be arranged in the width direction (the Y direction) or the length direction (the X direction) of the portable electronic device 1.

The first to third camera modules 2, 3, and 4 may be arranged in a triangular shape as a whole.

An optical imaging system according to an embodiment of the present disclosure may be mounted on a portable electronic device having a relatively small thickness, and may have a relatively long focal length.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens having positive refractive power, a second lens, a third lens, a fourth lens, and a fifth lens, arranged in order from an object side; and
a first reflective member disposed on an object side of the first lens, the first reflective member comprising a reflective surface configured to change a path of light incident on the first reflective member to be directed toward the first lens,
wherein the first lens is shaped such that a length of a first axis, which intersects an optical axis, is greater than a length of a second axis, which intersects the optical axis and is perpendicular to the first axis, and
wherein:

$4.5 < TTL/IMG\ HT < 6.5$;

$0.87 < TTL/f < 1.31$;

$0.65 < L1S1es/L1S1el < 0.9$; and $0 < L1S1el/PTTL < 0.2$, where TTL is a distance on the optical axis from an object-side surface of the first lens to an imaging surface of an image sensor, IMG HT is half a diagonal length of the imaging surface of the image sensor, f is a total focal length of the optical imaging system, L1S1el is a maximum effective radius of the object-side surface of the first lens, L1S1es is a minimum effective radius of the object-side surface of the first lens, and PTTL is a distance on the optical axis from the reflective surface to the imaging surface of the image sensor.

2. The optical imaging system of claim 1, wherein the first lens comprises an optical portion and a flange portion extending around at least a portion of the optical portion, and
wherein $0 < AL1/(PTTL)2 < 0.09$, where AL1 is an area of the optical portion of the object-side surface of the first lens, and PTTL is a distance along the optical axis from the reflective surface of the first reflective member to the imaging surface of the image sensor.

3. The optical imaging system of claim 1, further comprising a second reflective member disposed between the fifth lens and the image sensor,
wherein the second reflective member comprises a reflective surface configured to change a path of light passing through the first lens to the fifth lens to be directed toward the image sensor.

4. The optical imaging system of claim 1, wherein the first lens comprises an optical portion and a flange portion extending around at least a portion of the optical portion,
wherein the optical portion comprises a first edge, a second edge disposed on an opposite side of the first edge with respect to the optical axis, and a third edge and a fourth edge respectively connecting the first edge and the second edge, wherein the third edge is disposed on a side opposite to the fourth edge with respect to the optical axis, and a shortest distance between the first edge and the second edge is greater than a shortest distance between the third edge and the fourth edge.

5. The optical imaging system of claim 4, wherein 50°<α<92°, where a is an angle between a first virtual line connecting the optical axis from a connection point of the first edge and the fourth edge, and a second virtual line connecting the optical axis from a connection point of the second edge and the fourth edge.

6. The optical imaging system of claim 4, wherein 1.3<α/(2*FOV)<2.2, where FOV is an angle of view of the optical imaging system, and a is an angle between a first virtual line connecting the optical axis from a connection point of the first edge and the fourth edge, and a second virtual line connecting the optical axis from a connection point of the second edge and the fourth edge.

7. The optical imaging system of claim 1, wherein 0.9<BFL/(2*IMG HT)<3.0, where BFL is a distance along the optical axis from an image-side surface of the fifth lens to the imaging surface of the image sensor.

8. The optical imaging system of claim 1, wherein −0.7 mm<f1+f2<1.3 mm, where f1 is a focal length of the first lens, and f2 is a focal length of the second lens.

9. The optical imaging system of claim 1, wherein the second lens is shaped such that a length of a first axis of the second lens, which intersects the optical axis, is greater than a length of a second axis of the second lens, which intersects the optical axis and is perpendicular to the first axis of the second lens, and wherein 0.7<L2S1es/L2S1el<0.9, where L2S1el is a maximum effective radius of an object-side surface of the second lens, and L2S1es is a minimum effective radius of the object-side surface of the second lens.

10. The optical imaging system of claim 1, wherein the fifth lens is shaped such that a length of a first axis of the fifth lens, which intersects the optical axis, is greater than a length of a second axis of the fifth lens, which intersects the optical axis and is perpendicular to the first axis of the fifth lens, and wherein 1.3<L1S1el/L5S2el<1.7, where L5S2el is a maximum effective radius of an image-side surface of the fifth lens.

11. The optical imaging system of claim 10, wherein 1.3<(CT5/ET5)*L5S1el<2.5, where CT5 is a thickness along the optical axis of the fifth lens, ET5 is a thickness of an edge of the fifth lens, and L5S1el is a maximum effective radius of an object-side surface of the fifth lens.

12. The optical imaging system of claim 1, wherein the third lens is shaped such that a length of a first axis of the third lens, which intersects the optical axis, is greater than a length of a second axis of the third lens, which intersects the optical axis and is perpendicular to the first axis of the third lens, and wherein 1.3<L1S1el/L3S1el<1.7, where L3S1el is a maximum effective radius of an object-side surface of the third lens.

13. The optical imaging system of claim 12, wherein the fifth lens is shaped such that a length of a first axis of the fifth lens, which intersects the optical axis, is greater than a length of a second axis of the fifth lens, which intersects the optical axis and is perpendicular to the first axis of the fifth lens, and wherein 0.8<L3S1el/L5S1el<1.2, where L5S1el is a maximum effective radius of an object-side surface of the fifth lens.

14. The optical imaging system of claim 1, wherein the second lens has negative refractive power, the third lens has positive refractive power, the fourth lens has positive or negative refractive power, and the fifth lens has positive or negative refractive power.

15. The optical imaging system of claim 1, wherein the second lens and the third lens have negative refractive power, respectively.

16. The optical imaging system of claim 1, wherein the first lens comprises a convex object-side surface.

17. The optical imaging system of claim 1, wherein the first lens comprises a convex image-side surface.

18. The optical imaging system of claim 1, wherein the second lens comprises a concave image-side surface.

19. The optical imaging system of claim 1, wherein the third lens comprises a convex object-side surface.

20. The optical imaging system of claim 1, wherein the fourth lens comprises at least one concave surface.

21. The optical imaging system of claim 1, wherein the fifth lens comprises a concave image-side surface.

22. A portable electronic device comprising:
three or more camera modules, wherein an optical axis of a first camera module is formed in a different direction from an optical axis of a second camera module and an optical axis of a third camera module,
wherein the first camera module comprises the optical imaging system of claim 1, and
wherein the image sensor is configured to convert light incident through the first to fifth lenses to an electrical signal.

23. The portable electronic device of claim 22, wherein the first camera module comprises the narrowest angle of view and the longest focal length, the third camera module comprises the widest angle of view and the shortest focal length, and the second camera module comprises a wider angle of view than the first camera module and a narrower angle of view than the third camera module.

24. An optical imaging system, comprising:
a first lens having positive refractive power and a convex image-side surface, a second lens, a third lens, a fourth lens, and a fifth lens, arranged in order from an object side,
wherein the first lens is shaped such that a length of a first axis, which intersects an optical axis, is greater than a length of a second axis, which intersects the optical axis and is perpendicular to the first axis, and
wherein:

$4.5 < TTL/IMG\ HT < 6.5;$ $0.87 < TTL/f < 1.31;$ $0.65 < L1S1es/L1S1el < 0.9,$ where TTL is a distance on the optical axis from an object-side surface of the first lens to an imaging surface of an image sensor, IMG HT is half a diagonal length of the imaging surface of the image sensor, f is a total focal length of the optical imaging system, L1S1el is a maximum effective radius of the object-side surface of the first lens, and L1S1es is a minimum effective radius of the object-side surface of the first lens.

* * * * *